(12) United States Patent
Bachrach

(10) Patent No.: US 7,212,949 B2
(45) Date of Patent: May 1, 2007

(54) AUTOMATED SYSTEM AND METHOD FOR TOOL MARK ANALYSIS

(75) Inventor: Benjamin Bachrach, Bethesda, MD (US)

(73) Assignee: Intelligent Automation, Inc., Rockville, MD (US)

( * ) Notice: Subject to any disclaimer, the term of this patent is extended or adjusted under 35 U.S.C. 154(b) by 0 days.

(21) Appl. No.: 11/217,092

(22) Filed: Aug. 31, 2005

(65) Prior Publication Data

US 2006/0047477 A1    Mar. 2, 2006

Related U.S. Application Data

(60) Provisional application No. 60/605,998, filed on Aug. 31, 2004.

(51) Int. Cl.
G06F 11/30    (2006.01)

(52) U.S. Cl. .................... 702/182; 702/166; 702/167

(58) Field of Classification Search ................ 702/182, 702/166, 167
See application file for complete search history.

(56) References Cited

U.S. PATENT DOCUMENTS

| | | |
|---|---|---|
| 3,792,354 A | 2/1974 | Slaght et al. |
| 3,817,096 A | 6/1974 | Osofsky |
| 4,127,055 A | 11/1978 | Hottinger et al. |
| 4,128,829 A | 12/1978 | Herbst et al. |
| 4,379,405 A | 4/1983 | Engeler et al. |
| 4,845,690 A | 7/1989 | Oehler |
| 4,864,515 A | 9/1989 | Deck |
| 4,914,289 A | 4/1990 | Nguyen et al. |
| 5,164,998 A | 11/1992 | Reinsch |
| 5,349,853 A | 9/1994 | Oehler |
| 5,381,236 A | 1/1995 | Morgan |
| 5,390,108 A | 2/1995 | Baldur et al. |
| 5,413,029 A | 5/1995 | Gent et al. |
| 5,477,459 A | 12/1995 | Clegg et al. |
| 5,493,301 A | 2/1996 | Bossoli et al. |
| 5,512,998 A | 4/1996 | Puschell |
| 5,531,113 A | 7/1996 | Jamison |
| 5,638,298 A | 6/1997 | Edwards |

(Continued)

FOREIGN PATENT DOCUMENTS

RU    2120104 C1    10/1998

OTHER PUBLICATIONS

"Computer Identification of Bullets", G.Y. Gardner, Grumman Aerospace Corp., Bethpage, NY, Apr. 6, 1977, pp. 149-166.

(Continued)

*Primary Examiner*—John E. Barlow, Jr.
*Assistant Examiner*—Stephen J. Cherry

(57) ABSTRACT

An automated system for tool mark analysis includes an acquisition mechanism for acquiring 3D data of tool marks left on the surfaces of specimens by tools, a signature generation module for generating tool mark signatures from the acquired data, an analysis unit for comparing pairs of the tool mark signatures to obtain a numerical similarity value reflective of their similarity, and a database in which the similarity values are stored. An automated method for tool mark analysis involves the steps of acquiring the 3D data of tool marks, generating the tool mark signature, statistically evaluating pairs of the tool mark signatures, and providing a numerical similarity value for each pair of tool mark signatures reflecting the degree of similarity between the tool mark signatures of each pair. The method is carried out with automated assistance of a computer.

19 Claims, 22 Drawing Sheets

U.S. PATENT DOCUMENTS

| | | |
|---|---|---|
| 5,654,801 A | 8/1997 | Baldur |
| 5,659,489 A | 8/1997 | Baldur |
| 5,713,239 A | 2/1998 | Kirschner |
| 5,778,725 A | 7/1998 | Kirschner et al. |
| 5,796,474 A | 8/1998 | Squire et al. |
| 5,850,289 A | 12/1998 | Fowler et al. |
| 5,857,202 A | 1/1999 | Demoly et al. |
| 5,859,700 A | 1/1999 | Yang |
| 6,018,394 A | 1/2000 | Baldur |
| 6,020,594 A | 2/2000 | Tschudi |
| 6,154,562 A | 11/2000 | Baldur et al. |
| RE37,392 E | 9/2001 | Baldur |
| 6,317,258 B1 | 11/2001 | Watanabe |
| 6,505,140 B1 * | 1/2003 | Bachrach ............... 702/166 |
| 6,785,634 B2 | 8/2004 | Bachrach et al. |
| 2003/0149543 A1 * | 8/2003 | Bachrach et al. ........... 702/150 |

OTHER PUBLICATIONS

"Mathematical Proof of Striation Matches", Handbook of Firearms and Ballistics, B.J. Heard, XP-002310945, 1997, pp. 136-141.

* cited by examiner

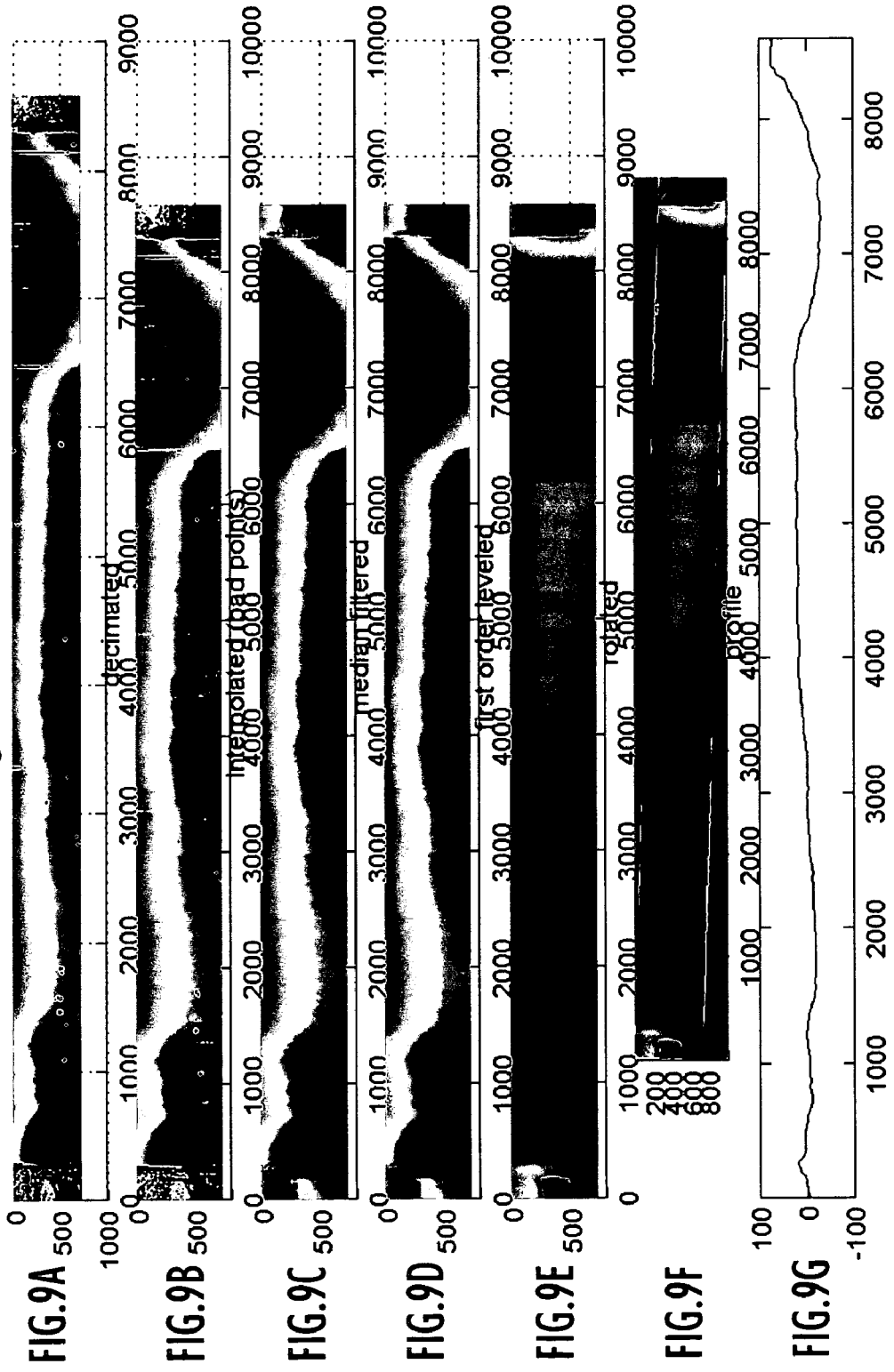

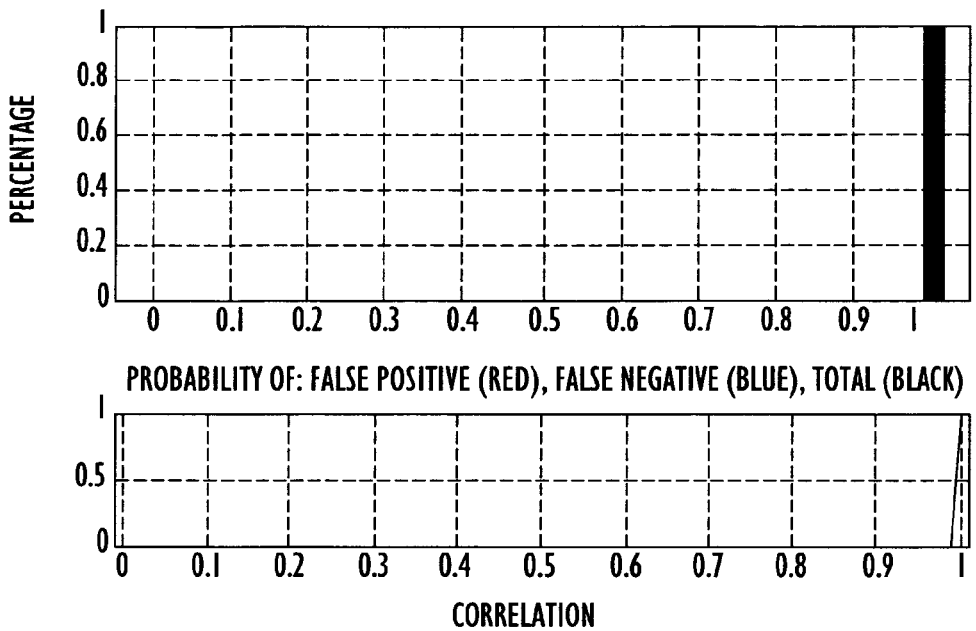

CORRELATION DISTRIBUTIONS: NON-MATCHING (BLUE), MATCHING (RED),
FILENAME : RESULTS20041108T171830.MAT

PROBABILITY OF: FALSE POSITIVE (RED), FALSE NEGATIVE (BLUE), TOTAL (BLACK)

TOOL : CCP, TOOLMARK PRIMER
TOOL SET 1 : 241, SAMPLES 4 5 6 7 8
TOOL SET 2: 241, SAMPLES 4 5 6 7 8

|  | OPTIMAL | ZERO FALSE POSITIVE |
|---|---|---|
| ESTIMATED THRESHOLD |  | % |
| ESTIMATED Pe | NaN% | % |
| ESTIMATED Pfp | % | % |
| ESTIMATED Pfn | % |  |

|  | MATCHING | NON MATCHING |
|---|---|---|
| NUMBER OF ENTRIES | 20 | 0 |
| MEDIAN | 0.999 |  |
| MEAN | 0.998 | NaN |
| STANDARD DEV | 0.000 | NaN |

| | | | |
|---|---|---|---|
| xLATRES | :2 | MINANGLE | :-3 |
| yLATRES | :2 | MAXANGLE | :3 |
| XEFFECTIVESIZE | :700 | NUMPOINTS | :7 |
| YEFFECTIVESIZE | :700 | MAXSHIFTFRACTIONX | :0.5 |
| MEDIANFILTERSIZEXPATCH | :1 | MAXSHIFTFRICTIONY | :0.5 |
| MEDIANFILTERSIZEYPATCH | :1 | HAMMING | :n |
| MEDIANFILTEROUTLIERSSTD | :0 | | |
| PATCHSIZEY | :690 | | |
| STDTOLERANCE | :2 | | |

FIG.24

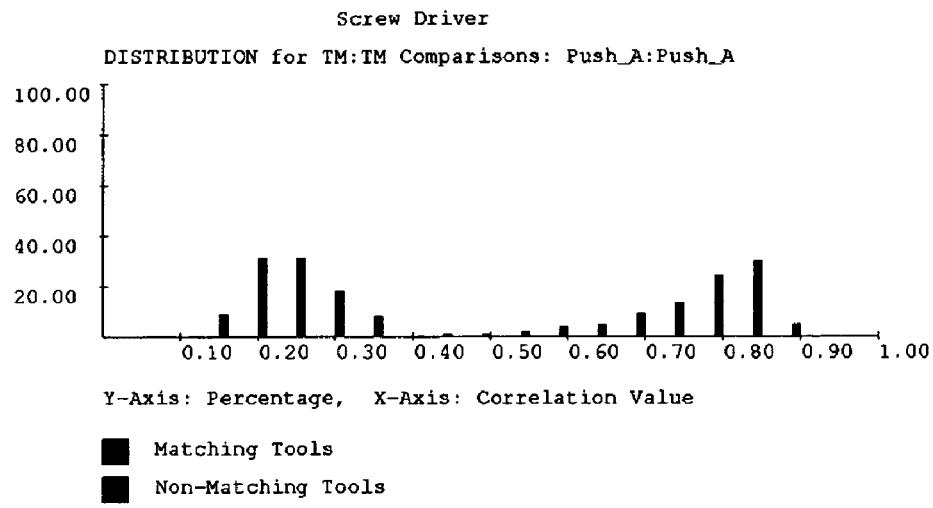
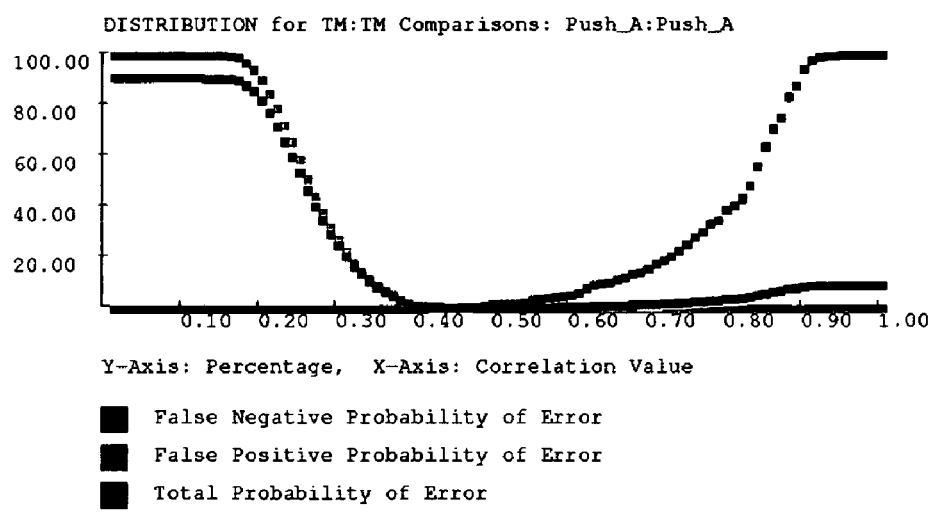
```
DISTRIBUTION for TM:TM Comparisons: Push_A:Push_A
---------------------------------------------------------------------
STATISTIC:               MATCHING:           NON-MATCHING:
Number of Entries:       450                 4500
Median:                  0.833382            0.261535
Mean:                    0.797018            0.268249
Standard Deviation:      0.098927            0.056097
PROBABILITY OF ERROR for TM:TM Comparisons: Push_A:Push_A
---------------------------------------------------------------------
STATISTIC:               OPTIMAL:            ZERO FALSE POSITIVE:
Estimated Threshold:     0.470000            0.480000
Estimated PE:            0.000606            0.000606
Estimated PFP:           0.000222            0.000000
Estimated PFN:           0.004444            0.006667
```
FIG.27

| Tool mark | Non-matching | | Matching | |
|---|---|---|---|---|
| | mean | Standard deviation | mean | Standard Deviation |
| Screwdriver Striation | .268 | .056 | .797 | .098 |
| Screwdriver Impression | .378 | .096 | .838 | .164 |
| Bolt Cutter Impression | .434 | .131 | .888 | .159 |

FIG.28

Screw Driver
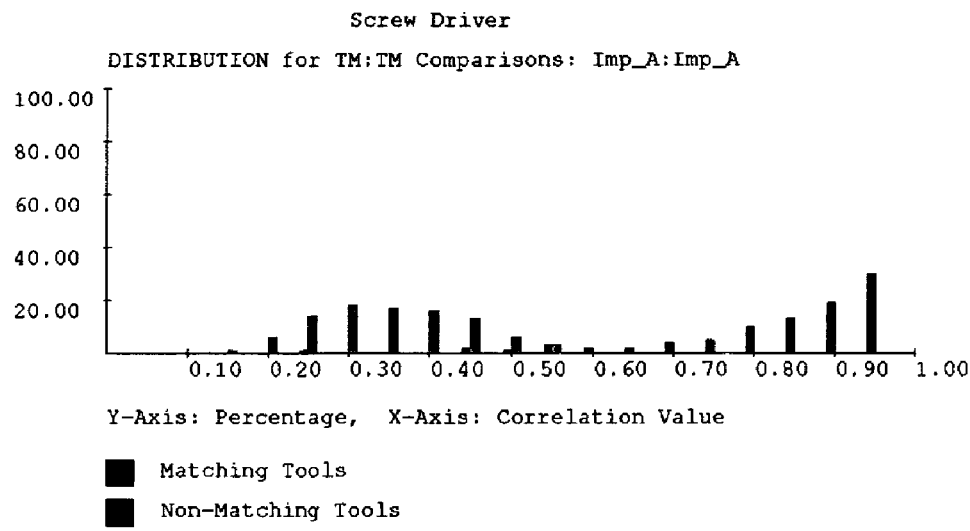
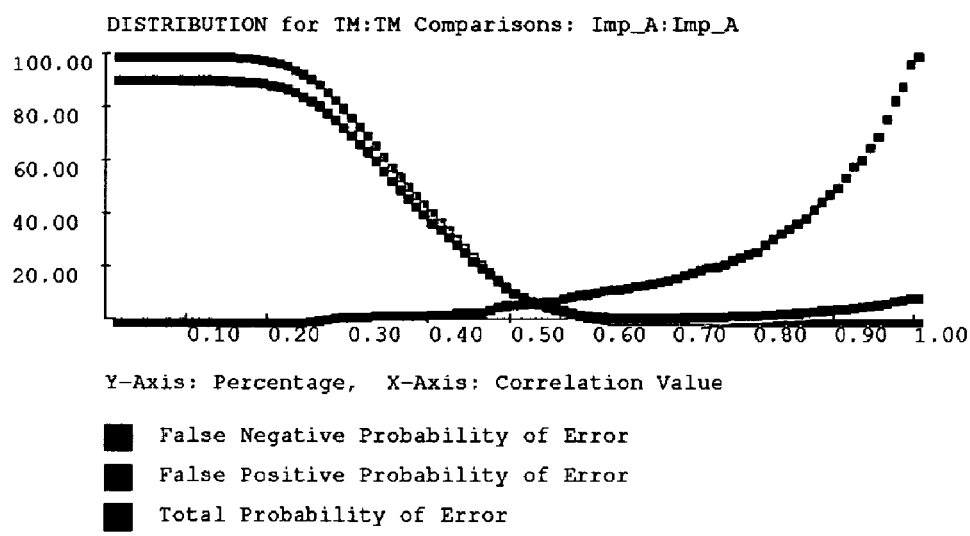
```
DISTRIBUTION for TM:TM Comparisons: Imp_A:Imp_A
-----------------------------------------------------------------
STATISTIC:              MATCHING:          NON-MATCHING:
Number of Entries:      450                4500
Median:                 0.896203           0.373454
Mean:                   0.838801           0.378882
Standard Deviation:     0.164645           0.096882
PROBABILITY OF ERROR for TM:TM Comparisons: Imp_A:Imp_A
-----------------------------------------------------------------
STATISTIC:              OPTIMAL:           ZERO FALSE POSITIVE:
Estimated Threshold:    0.650000           0.740000
Estimated PE:           0.014343           0.018788
Estimated PFP:          0.002222           0.000000
Estimated PFN:          0.135556           0.206667
```
FIG.29

AUTOMATED SYSTEM AND METHOD FOR TOOL MARK ANALYSIS

CROSS-REFERENCE TO RELATED PATENT APPLICATION

This application claims priority from prior provisional patent application Ser. No. 60/605,998 filed Aug. 31, 2004, the entire disclosure of which is incorporated herein by reference.

BACKGROUND OF THE INVENTION

1. Field of the Invention

The present invention relates generally to automated tool mark analysis and, more particularly, to the automated acquisition and comparison of tool mark data using three-dimensional information.

2. Brief Discussion of the Related Art

Objects that are acted or operated on by tools are normally left with tool marks as a result of being acted or operated on by the tools. Many types of commonly used mechanical tools, such as screw drivers, pliers, bolt cutters, crimping tools, hammers and other mechanical tools, impart tool marks to the objects they are used on. Tool marks generally comprise regions where the surfaces of the objects have been deformed or altered because microscopic imperfections on the working surface or surfaces of a particular tool are transferred to the surface of the object on which the tool is used, creating depth or elevational variances in the surfaces of the objects. An individual tool mark may present many depth or elevational variances, and these variances are often microscopic so as to be indetectable with the naked eye. Different types of tools will ordinarily create different types of tool marks in accordance with the structure of the tool and the manner in which the tool operates to apply force or pressure to the object. Tool marks that predominantly present striations may be considered striated tool marks, and tools that impart striated tool marks may be referred to as striation-creating tools. Tool marks that predominantly present impressions may be considered impressed tool marks, and tools that impart impressed tool marks may be referred to as impression-creating tools. Some tools may be both striation-creating and impression-creating tools. Slotted screw drivers and tongue and groove pliers are examples of tools that create striated tool marks on objects on which the tools are operatively utilized. Crimping tools, bolt cutters and hammers are examples of tools that create impressed tool marks on objects on which the tools are operatively utilized. Tongue and groove pliers are representative of tools that can create impressed tool marks and striated tool marks (along two possible axes, parallel and perpendicular to the plier jaws) on objects on which the tools are operatively utilized.

Forensic examination of tool marks is normally performed by a tool marks examiner, who is responsible for determining whether a suspect tool created an evidence tool mark. In practice, the tool marks examiner typically creates test tool marks using the suspect tool, and then compares microscopic surface features of the test tool marks with microscopic surface features of the evidence tool mark. Currently these tool mark-to-tool mark comparisons are made manually by the tool marks examiner visually inspecting pairs of tool marks under a comparison microscope, making forensic tool mark examination a very time consuming process. In reaching a conclusion, the tool marks examiner relies on his or her training and judgement, thusly requiring for credibility a high level of training and skill on the part of the tool marks examiner. Even if certain of a particular conclusion, however, the tool marks examiner is generally unable to quantify his or her level of certainty or the probability of making an erroneous conclusion. The foregoing limitations of current tool mark evaluation are particularly disadvantageous in view of the raised expectations for quantitative precision in forensic analysis resulting from the development of DNA identification techniques and the high level of accuracy achievable in the establishment of error rates associated with DNA identification. In addition, recent Supreme Court decisions have established a trend toward requiring objective validity for forensic and scientific testimony and evidence.

Automated comparison and analysis systems have been proposed for forensic identification, and the majority of these rely on two dimensional (2D) representations of the three dimensional (3D) surface features of objects or specimens. The 2D representations are derived from 2D data acquisition which is fundamentally an indirect measurement of the 3D surface features. In 2D data acquisition, a source of light is directed at the specimen's surface, and a camera records the light as it is reflected by the specimen's surface. The 2D data acquisition process is based on the fact that the light reflected by the specimen's surface is a function of its surface features. For this 2D acquisition methodology to be effective, the incident light angle and the camera view angle cannot be the same with respect to the specimen's surface and, in actuality, must be significantly different in order to obtain a pattern of dark-and-bright reflections of the specimen's surface.

One problem of 2D data acquisition is that the transformation relating light incident on the specimen's surface and light reflected by the specimen's surface depends not only on the surface features but also on numerous independent parameters including the incident light angle, the camera angle, variations in the reflectivity of the specimen's surface, light intensity and accurate specimen orientation. Consequently, the acquired 2D data is also dependent on these parameters. Existing 2D-based analysis and comparison systems ordinarily do not compensate for the effects of these parameters on the acquired 2D data. Another problem of 2D data acquisition relates to the phenomenon of "shadowing" resulting from smaller surface features being "shadowed" by larger surface features for a given incident light angle. Arbitrarily small changes in the incident light angle may determine whether certain surface features are detected or not, and a similar problem applies to the angle of view of the camera. In mathematical terms, the transformation between the incident light and the reflected light is discontinuous with respect to the incident light angle (and the angle of view of the camera), such that there may be regions of the specimen's surface where the acquired data does not accurately reflect the surface features. Some of the benefits of 2D data relate to the relatively faster speeds with which 2D data can be acquired, as opposed to 3D data, and to the familiarity of tool marks examiners with 2D representations of a specimen's surface.

In contrast to 2D data acquisition, 3D data acquisition is for all practical purposes a direct measurement. Data acquired using a 3D-based data acquisition methodology is in general more robust than that attainable with existing 2D-based automated microscopic examination systems. The richness of a 3D characterization of the surface of an object surpasses that of a 2D characterization. Furthermore, 3D-based data acquisition methodologies generally avoid arbitrary large errors in the measurement of surface features in response to small variations in the incident light angle. U.S. Pat. No. 6,785,634 to Bachrach et al and No. 6,505,140 to Bachrach are representative of 3D-based automated systems and methods in the area of ballistics analysis.

SUMMARY OF THE INVENTION

An automated system for tool mark analysis is generally characterized in an acquisition mechanism for acquiring 3D data of tool marks left on the surfaces of specimens by tools operating on the specimens, a signature generation module for generating tool mark signatures from the acquired data, and an analysis unit for statistically evaluating pairs of the tool mark signatures in relation to one another. The analysis unit computes a numerical similarity value for each pair of tool mark signatures reflecting the degree of similarity between the tool mark signatures. A system includes a database in which the similarity values are stored. Prior to signature generation, the acquired 3D data can be refined using a pre-processing module, a calibration module and a normalization module of the system. In order to expand the capabilities of the system, the system may include a classifier module and a uniqueness evaluator module.

An automated method for tool mark analysis is generally characterized in the steps of acquiring 3D data of tool marks left on the surfaces of specimens by tools operating on the specimens, generating tool mark signatures for the respective tool marks from the acquired 3D data via a computer, statistically evaluating pairs of the tool mark signatures in relation to one another via the computer, and providing a numerical similarity value via the computer for each pair of tool mark signatures wherein the similarity value reflects the degree of similarity between the tool mark signatures. Prior to the step of generating tool mark signatures, the method may involve refinement of the acquired 3D data via various steps of pre-processing, calibrating and normalizing the data. In addition, the method may further involve steps relating to classification and uniqueness evaluation of tool marks.

Various objects, advantages and benefits of the automated system and method for tool mark analysis will become apparent from the following description of the preferred embodiments taken in conjunction with the drawings.

BRIEF DESCRIPTION OF THE DRAWINGS

FIG. 9A is a photographic image of a plot of raw data acquired for a striated tool mark.

FIG. 9B is a photographic image of a plot of the raw data of FIG. 9A after decimation.

FIG. 9C is a photographic image of a plot of the data of FIG. 9B after unreliable data points have been identified and replaced with interpolated values.

FIG. 9D is a photographic image of a plot of the data of FIG. 9C after second order leveling.

FIG. 9E is a photographic image of a plot of the data of FIG. 9D after first order leveling.

FIG. 9F is a photographic image depicting the data of FIG. 9E after being rotated following identification of the direction of the striations.

FIG. 9G is a graph depicting the profile cross-section computed from the data of FIG. 9F.

FIG. 24 is an example of a final report of batch comparison between five tool mark images.

FIG. 27 depicts a representative distribution of similarity values obtained by comparing matching and non-matching striated tool mark signatures.

FIG. 28 is a table summarizing some of the statistical results associated with the distribution of matching and non-matching similarity values for examples of striated and impressed tool mark signatures.

FIG. 29 illustrates a representative distribution of similarity values obtained by comparing matching and non-matching impressed tool mark signatures.

DESCRIPTION OF THE PREFERRED EMBODIMENTS

The automated system for tool mark analysis and the method for tool mark analysis described herein are designed to perform automated acquisition and comparison of tool mark data using 3D information in an objective, unbiased manner. The automated system and method for tool mark analysis involves the characterization of tool marks as 3D objects and the use of statistical methodologies applied to a well-defined similarity metric to quantify the statistical difference between known matching and known non-matching tool marks. The automated system and method for tool mark analysis are capable of providing a numerical value reflecting the degree of similarity between two tool marks under comparison, a statistically-based assessment of the likelihood that a particular tool created a pair of tool marks under consideration, and/or an assessment of the uniqueness of the tool marks of a particular class. Various features of the system and method for tool mark analysis involve high level mathematics and statistics which would be impractical to fully explain herein in detail. Accordingly, subject matter within the general knowledge of one skilled in the art is omitted from the description while that subject matter needed for one skilled in the art to practice the invention is fully explained.

Figure 1:
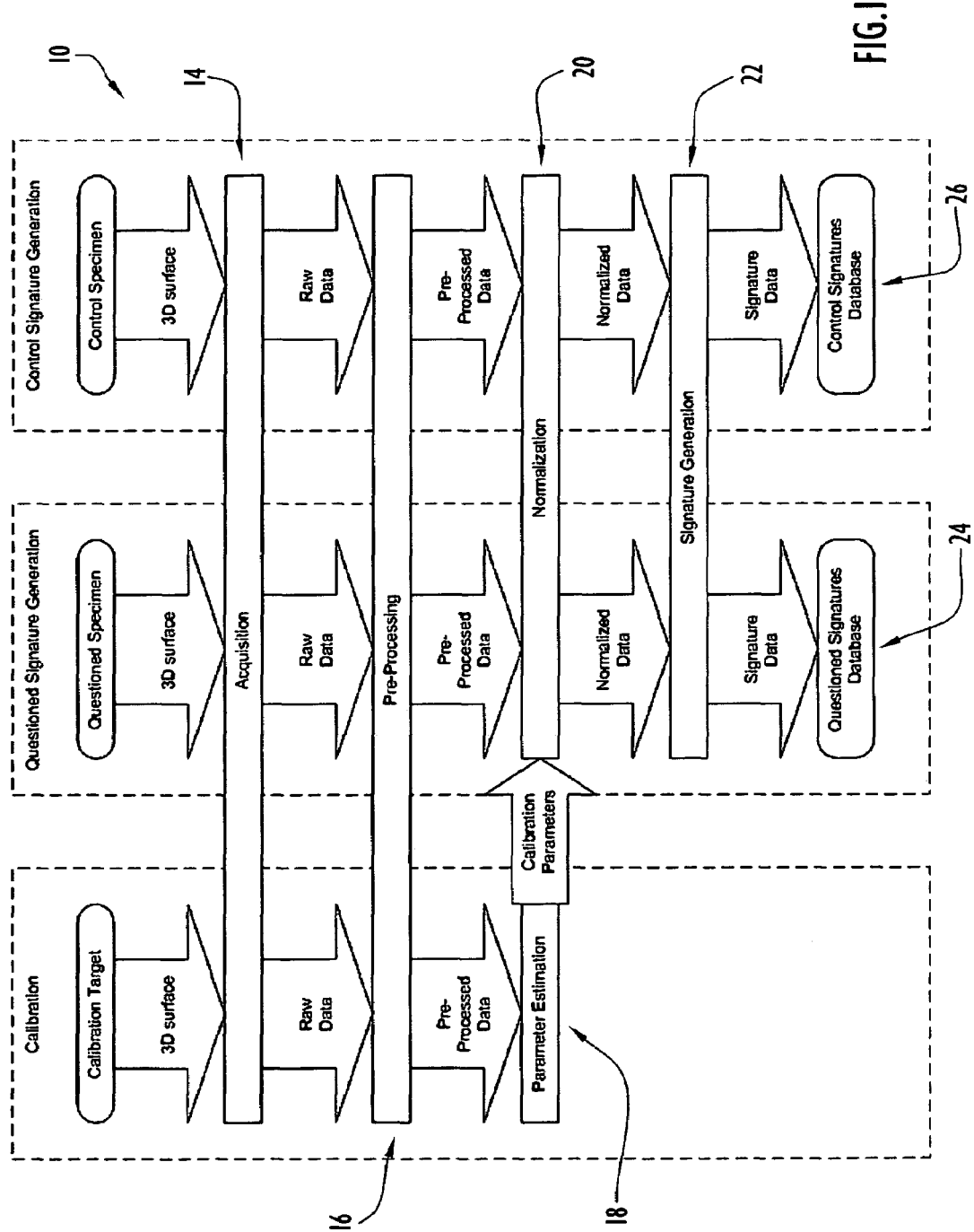
FIG. 1 is a block diagram depicting a data unit of the automated tool mark analysis system.
Figure 2:
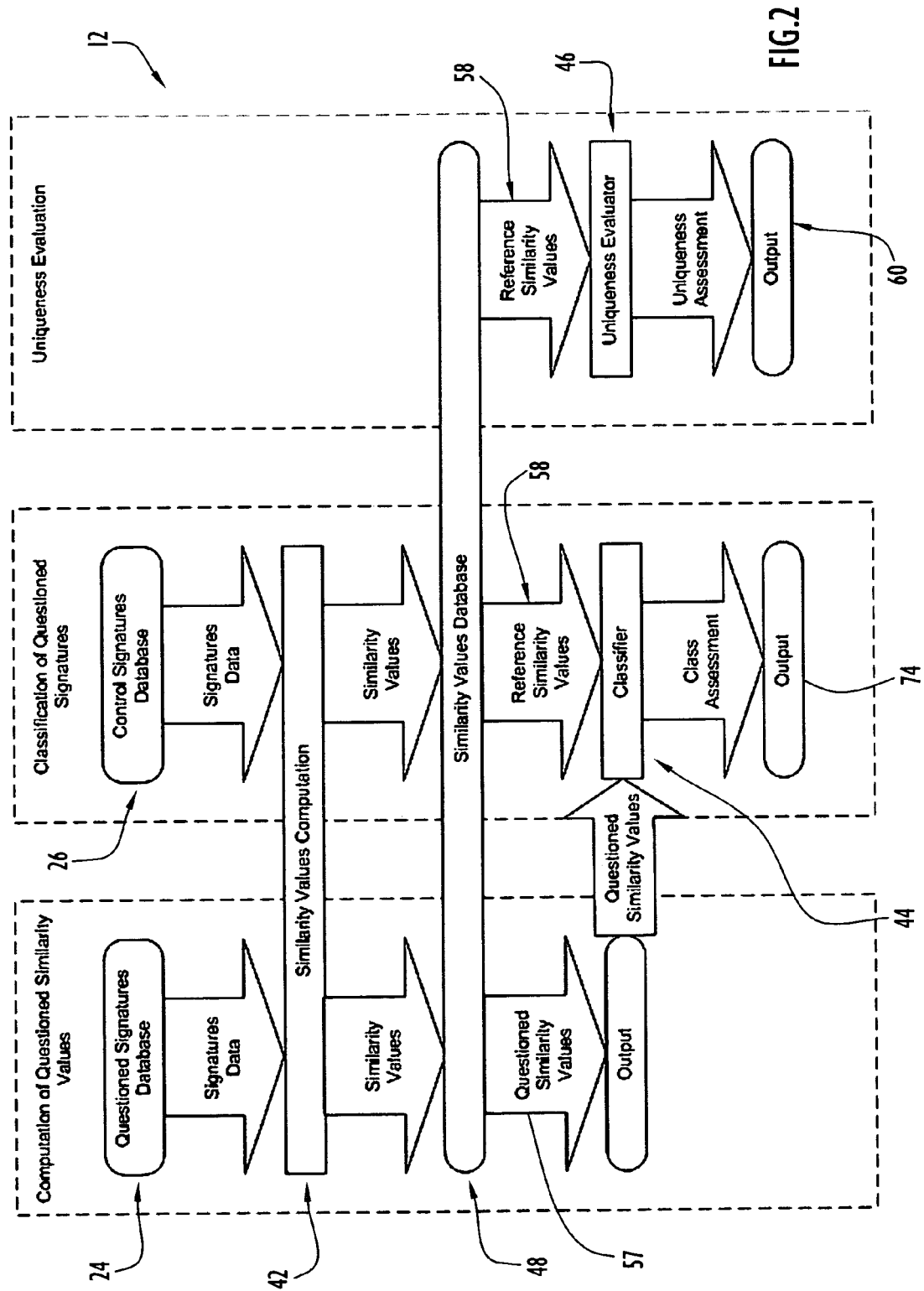
FIG. 2 is a block diagram illustrating an analysis unit of the automated tool mark analysis system.

The automated system for tool mark analysis includes a data unit 10, illustrated in FIG. 1, an analysis unit 12, illustrated in FIG. 2, and a computer (not shown) having hardware and software to implement the functions of the data unit and the analysis unit. The computer includes a processor for executing the functions of the data unit 10 and analysis unit 12, and a monitor for displaying information visually. In addition, the computer may provide information audibly, and may include a printer for providing printed information. The data unit 10 is responsible for data acquisition, processing and storage. The functions performed by data unit 10 include data acquisition, data pre-processing, data calibration, data normalization, questioned signature generation, and control signature generation. These functions are performed via an acquisition module 14, a pre-processing module 16, a calibration module 18, a normalization module 20, and a signature generation module 22, resulting in a questioned signatures database 24 and a control signatures database 26 which are stored in the data unit 10.

Figure 3:
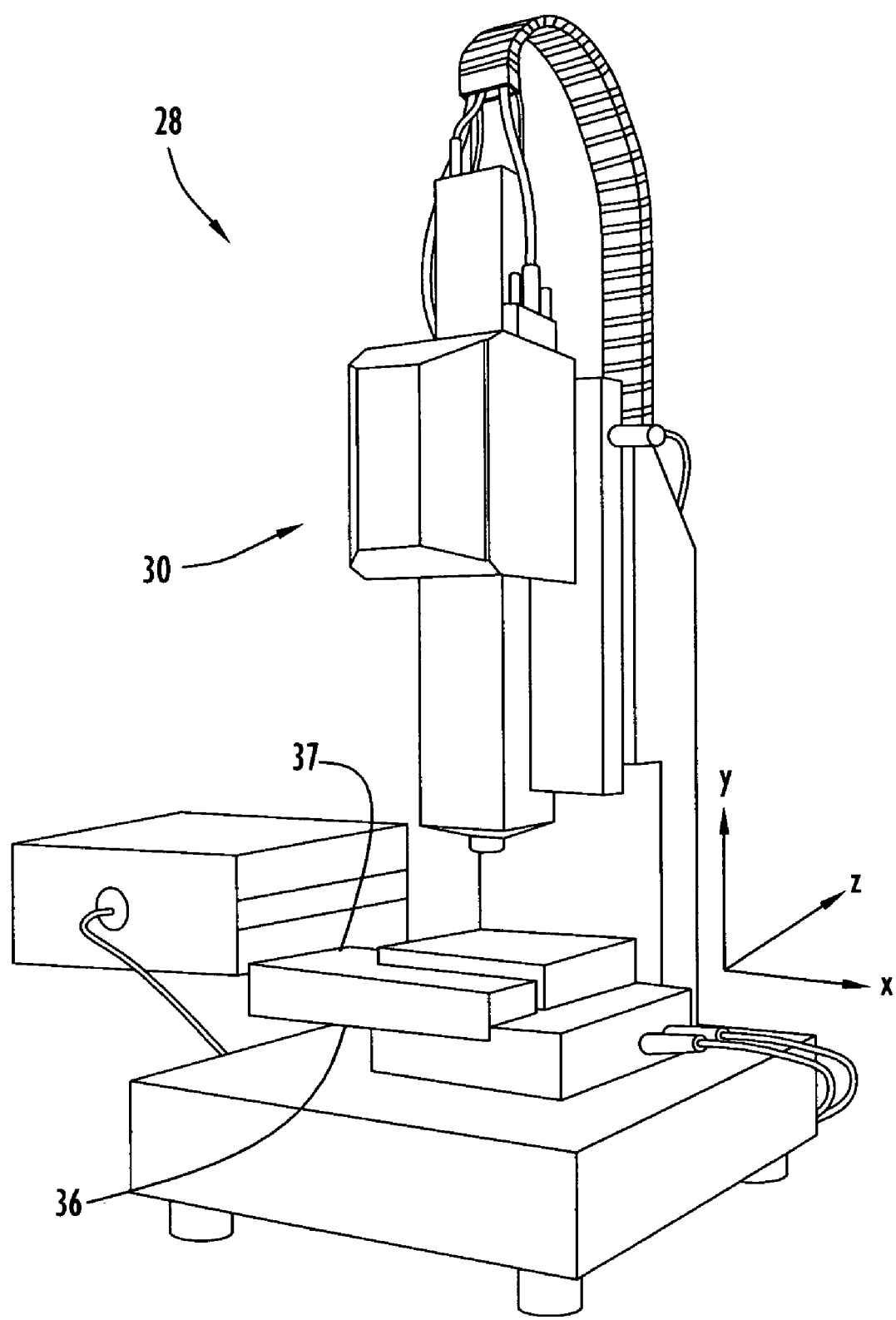
FIG. 3 illustrates an acquisition platform of the automated tool mark analysis system.

The acquisition module 14 includes an acquisition platform 28, shown in FIG. 3, by which 3D data is acquired from various input specimens or objects. The types of input specimens for which 3D data can be acquired using the acquisition platform 28 are shown in FIG. 1 and include a target specimen (labeled "calibration target" in FIG. 1) of well-known accurate dimensions obtained for the purpose of identifying mechanical misalignment parameters of the acquisition platform 28, questioned specimens (labeled "questioned specimen" in FIG. 1) obtained for the purpose of identifying the origin of tool marks thereon, and control specimens (labeled "control specimen" in FIG. 1) having tool marks thereon of known origin obtained for the purpose of providing a statistical reference of the characteristics to be expected from matching and non-matching specimens/tool marks. It should be appreciated that the automated tool mark analysis system does not require the use of control specimens; however, in this case, the system would be limited in its capability to perform the classification and/or individuality (uniqueness) analyses discussed further below.

The acquisition module 14 acquires 3D data (or topographical data) from the surface of a given specimen and encodes it in a format that can be processed by the computer. This data may be considered raw data and is closely related to the technology used to record the desired features of the specimen's surface. In the case of acquisition module 14, the acquisition platform 28 includes a 3D imaging system 30 for making precise measurements of a specimen's surface and, in particular, a tool mark or marks on a specimen's surface. Preferably, the 3D imaging system 30 operates using non-contacting technology to avoid altering or damaging the input specimens, has a minimum depth resolution of 0.1 micrometers, has a minimum lateral resolution of 1 micrometer, does not require extensive operator training, and does not require extensive preparation of the input specimens. Cost is also an important consideration. In a preferred embodiment, the 3D imaging system 30 includes a confocal-based sensor for acquiring 3D data from a specimen's surface. Confocal-based sensors may offer the best compromise between cost and performance, and a representative confocal-based sensor suited for use in the automated system for tool mark analysis is the MicroSurf confocal microscope manufactured by NanoFocus Incorporated of Germany.

Figure 4:
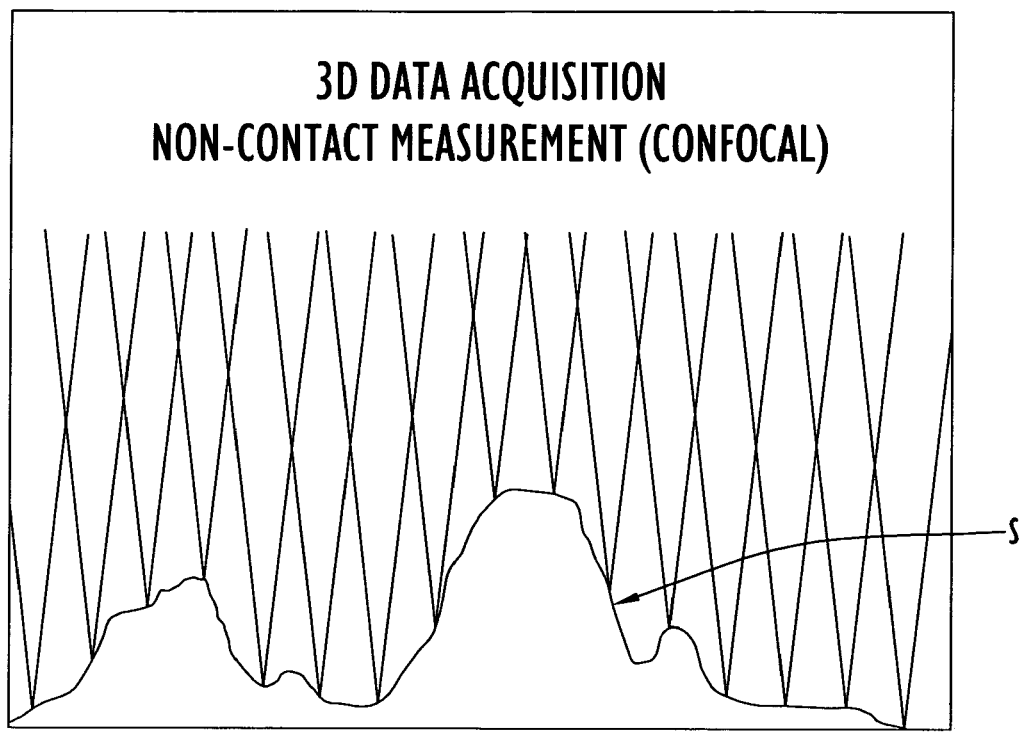
FIG. 4 is a graphical representation of 3D data acquisition.

The confocal-based sensor operates by projecting a laser beam through a lens onto the surface of a specimen being measured and detecting the reflection of the laser beam with the same lens as represented by FIG. 4. The sensor continuously displaces the lens in order to maintain the reflected laser beam focused at a given focal plane. By detecting the position of the lens, it is possible to accurately follow the surface S under measurement, which is characterized by many variances in depth. The angle of incidence and the angle of reflection of the laser beam are the same, so that the measurements can be made along a direction perpendicular to the specimen's surface S. The data acquired using a confocal sensor is the distance between the surface features and an imaginary plane. The laser beam used by a confocal sensor to detect the depth of the surface S under measurement occupies a conical region, and proper operation of the sensor requires that this conical region be unobstructed. Consequently, confocal sensors are limited with respect to the steepness of the surfaces they can measure. However, although steep surfaces can cause distortion of the measured depth, this distortion is not discontinuous with respect to the angle of incidence of the laser beam. Accordingly, small variations in the angle of incidence of the laser beam cannot result in arbitrary large errors in the measured depth, thusly providing an advantage over 2D data acquisition.

Figure 5:
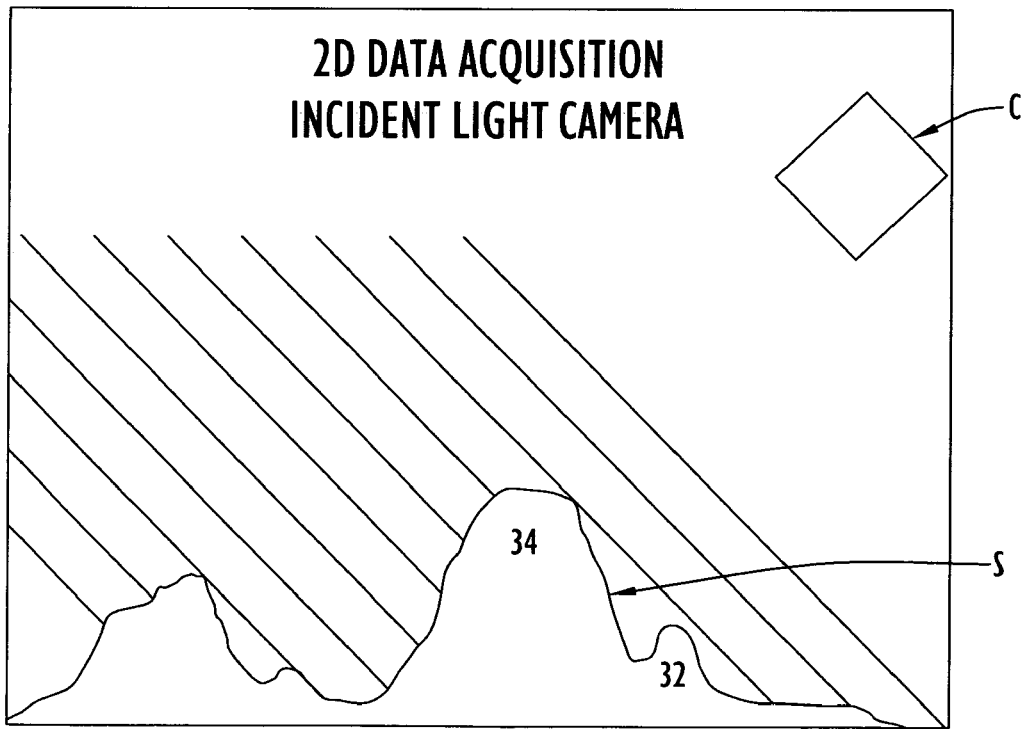
FIG. 5 is a graphical representation of 2D data acquisition.

FIG. 5 is illustrative of 2D data acquisition wherein incident light is directed at a specimen's surface S and a 2D camera C records the light reflected from the surface S. The incident light angle and the camera view angle cannot be the same with respect to the surface and, in actuality, must be significantly different in order to obtain a pattern of dark-and-bright reflections of the surface S. The transformation relating the incident light and the reflected light depends not only on the features found on the surface S but also on independent parameters including the incident light angle, the camera view angle, variations in reflectivity of the surface, light intensity, and accuracy of specimen orientation. The acquired 2D data is also dependent on these parameters, yet existing 2D based acquisition systems do not compensate for the effects of these parameters. The phenomenon of "shadowing" associated with 2D data acquisition is also evident from FIG. 5 which shows surface feature 32 shadowed by larger surface feature 34. Accordingly, there may be regions of the surface S for which the acquired data does not accurately reflect the surface features. Furthermore, the angle of the incident light can have a critical effect on the acquired data since arbitrary small changes in the incident light angle may determine whether or not surface feature 32 is detected. A similar problem pertains to the angle of view of the camera. In mathematical terms, the transformation between the incident light and the reflected light is discontinuous with respect to the angle of incident light and the angle of view of the camera. On the other hand, due to its acquisition speed, 2D data acquisition offers the advantage of allowing an operator or tool marks examiner to visually identify and select the regions of a specimen's surface to be used for analysis. Preferably, therefore, the acquisition module 14 further includes a 2D camera C allowing an operator to view and select the region of the specimen's surface to be acquired by the 3D imaging system 30. The 2D camera C may be provided as part of the 3D imaging system 30 or may be provided independently thereof. The integration of both 2D and 3D data acquisition maximizes performance in that the 2D image allows the tool marks examiner or operator to select the region of the specimen's surface to be used for comparison while the more reliable 3D acquired data is used to perform the tool mark comparison.

The acquisition mechanism 28 further comprises a motion control arrangement 36 for manipulating a specimen within range of the 3D imaging system 30 and to allow for the automatic acquisition of data. The motion control arrangement 36 includes a computer-controlled translational support 37 for supporting a specimen along a horizontal axis x and along a vertical axis y under control of the computer. Preferably, the support 37 is also movable along a horizontal axis z under control of the computer. Providing for computer-controlled movement or translation of the support 37 along the x, y and z axes significantly decreases operator load and improves the repeatability of the acquired data.

The data acquisition module 14 incorporates data acquisition software controlling the acquisition process by commanding the acquisition mechanism 28 in response to operator input to the computer. The acquisition process involves selecting a region of interest on the specimen's surface, e.g. a tool mark, and taking measurements within this region in a grid-like fashion. For each point under consideration, the depth measured by the 3D imaging system 30 and the location of each of the computer-controlled translational stages for the translational support 37 are recorded. This information is converted into a dimensionally faithful 3D dataset representing the region of interest, i.e. a tool mark, on the specimen's surface. As noted above, the region of interest may be selected using 2D visualization provided by a 2D camera C used as a navigation tool.

Software components of the data acquisition module 14 include a graphical user interface (GUI) and a raw data database to store raw 3D data acquired by the acquisition mechanism 28 as described above. The graphical user interface (GUI) allows the operator to navigate over a tool mark of interest on the surface of a specimen positioned on the translational support 37 to locate the regions of the tool mark most relevant for comparison. The raw data database stores the raw 3D data and allows the raw data to be re-processed whenever any of the pre-processing, normalizing, or signature generating algorithms undergoes revision. The raw 3D data may be stored in the raw data database as a two-dimensional array in which z=z (x,y) but other data storage approaches are possible including (x,y,z) coordinates.

The pre-processing module 16 is responsible primarily for eliminating or otherwise accounting for sensor "noise", dropped points and outliers that might contaminate the raw 3D surface data. The main purpose of the pre-processing module 16 is to "clean" the raw data of dropped points (points which the sensor was not able to acquire), outliers (points which the sensor was able to acquire but which are inaccurate), and other "noisy" or unreliable data points. In general, the data pre-processing function performed by the pre-processing module 16 via the associated software involves identifying unreliable data points, recording unreliable data points and correcting unreliable data points either by replacing erroneous data with an optimal estimate or by reacquiring the data points deemed to be unreliable. Unreliable data points may be identified by using a "mask" so that they can be excluded from comparison. The "mask" may comprise an array of the same dimensions as the 3D data array and having entries of "1" for data points deemed to be reliable and "0" for data points identified as dropped points, outliers, or otherwise noisy or unreliable data points.

More specifically, the data pre-processing function performed by the pre-processing module 16 in one preferred embodiment of the system and method for automated tool mark analysis involves data decimation, identification of dropped points, outliers and otherwise "noisy" or unreliable data points, recording of unreliable data points, interpolation, and identification of the most promising data section within the available data. Data decimation is not necessary, but may be desirable in order to decrease the computation and storage requirements of the system. Decimating the raw data makes it possible to work with data sets of resolution lower than that available in the undecimated raw data set. The identification of dropped points and interpolation relate to the fact that most 3D acquisition systems provide the operator with a "level of confidence" value associated with each data point taken. In optical systems such as the 3D imaging system 30, the "level of confidence" usually corresponds to the percentage of light reflected by the specimen. If the "level of confidence" value is too low, the data point is deemed unreliable. In the data pre-processing performed by the pre-processing module 16, all such unreliable data points are identified as dropped points. As opposed to dropped points, outliers are data points inaccurately measured by the 3D imaging system 30 but which the imaging system does not report to the operator as being inaccurate. Outliers can be identified by the pre-processing module 16 estimating the local slope between a data point and its neighboring data points. If the slope is above a certain threshold, the data point is identified by the pre-processing module 16 as an outlier. Alternatively or in addition to the latter approach, the pre-processing module 16 can identify outliers by evaluating the statistical distribution of the data. More specifically, if a particular data point is excessively far from the local median, in terms of standard deviations, it is identified as an outlier by the pre-processing module 16. As part of this stage of pre-processing, all such outlier points are identified. The interpolated values can be computed by the software associated with the pre-processing module 16 in a variety of ways and for a variety of neighborhoods. Replacing the unreliable data points with interpolated values facilitates and enhances visual display of the data via the computer system. Replacing the unreliable data points with interpolated values facilitates and enhances visual display of the data via the computer system.

Having automatically identified the unreliable data points including both dropped points and outliers, the pre-processing module 16 identifies a section of pre-defined dimensions within the acquired data which shows the least number of unreliable data points and which satisfies a desirable pre-selected constraint, such as being closest to the center of the region of interest chosen by the operator, being to the left of the region of interest, or being to the right of the region of interest, for example. As noted above, this region of interest will preferably have been selected by the operator with the aid of the 2D camera used as a navigation tool. This section of pre-defined dimensions is isolated and subsequently used by the data unit 10 as the pre-processed data. Identifying the most promising data section serves as an aid to the operator because often the boundaries of the region of interest include a relatively large number of unreliable data points.

Once "noise" has been eliminated from the acquired data, or otherwise accounted for by the pre-processing module 16, the normalization module 20 is responsible primarily for compensating for systemic artifacts that may contaminate the acquired raw data. Most often, such artifacts are by-products of the data acquisition process caused by two main phenomena: misalignments of the mechanical components of the acquisition mechanism 28 which control the position of the sensor used to acquire the raw data from the specimen and/or misalignments between the specimen under measurement and the mechanical components. In order to compensate for these effects, the system should have accurate information regarding misalignments of the mechanical components, which may vary among different acquisition mechanisms and may even vary within the same acquisition mechanism after disassembling and reassembling the acquisition mechanism. The calibration module 18 includes software for computing calibration or misalignment parameters to be used by the normalization module 20 to compensate for mechanical misalignments. The calibration procedure performed by the calibration module 18 involves acquiring data acquired by the acquisition module from a well-known, accurately defined target specimen (labeled calibration target in FIG. 1) and using the pre-processed data thus acquired to estimate calibration parameters reflecting misalignment of the mechanical components. As an example, the target specimen may be a cylinder or a flat surface. The calibration parameters are estimated by the calibration module 18 via a recursive optimization algorithm that compares the pre-processed data acquired for the target specimen to the data expected for the target specimen. The data expected for the target specimen can be derived by modeling since the features of the target specimen are known a priori. The result of this comparison is evaluated by its mean square error value, and the calibration module 18 operates by "tuning" the calibration parameters until the mean square error value between the expected data and the acquired data for the target specimen falls below a pre-established threshold. The calibration parameters thusly obtained are used by the normalization module 20 to compensate for extraneous artifacts resulting from the data acquisition process.

The calibration parameters and the pre-processed data for the questioned specimens and, if available, the control specimens, serve as input for the normalization module 20. The processes performed by software of the normalization module 20 include transforming the pre-processed data into Cartesian coordinates and normalizing the Cartesian coordinate representation of the data with respect to a reference surface. Transforming the pre-processed data into Cartesian coordinates requires knowledge of the calibration parameters associated with the acquisition mechanism 28. The implementation details of the normalization module 20 depend on the configuration of the acquisition mechanism 28 and the tool mark under consideration.

Figure 6:
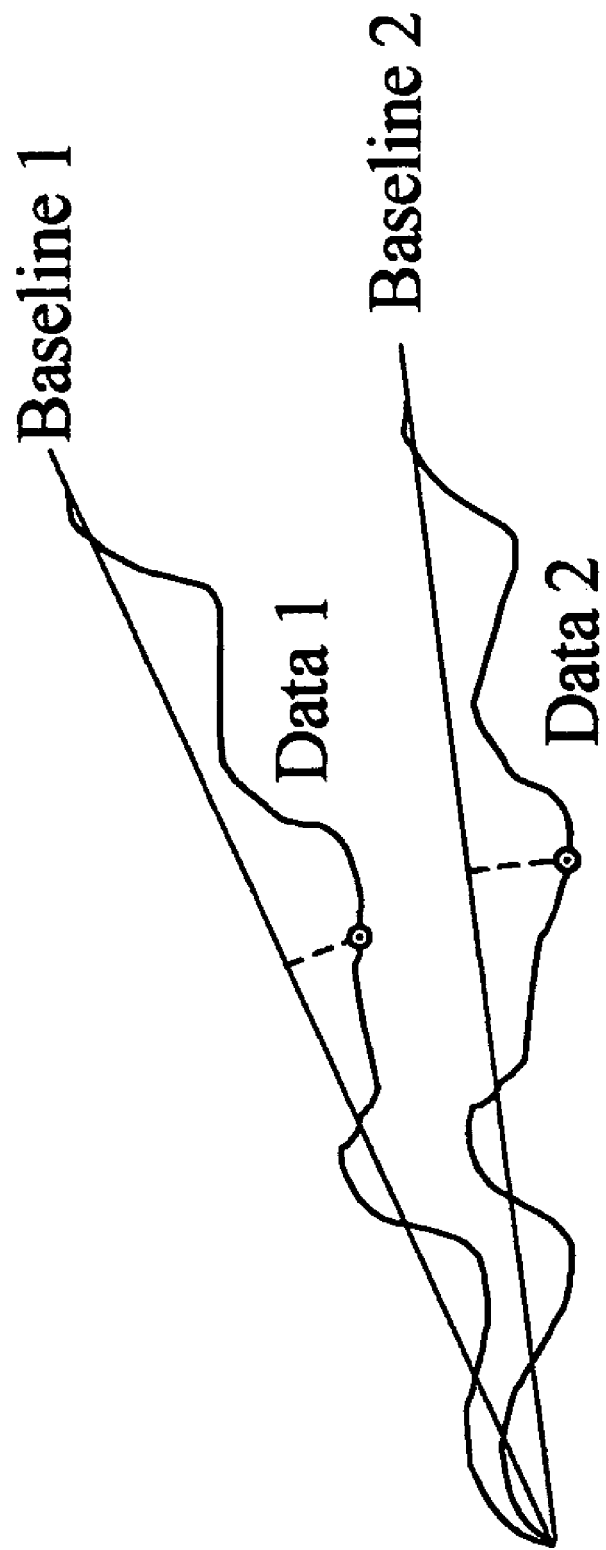
FIG. 6 shows a conceptual example of 3D data normalization in the case of tilt discrepancies.

Normalizing the Cartesian coordinate representation of the pre-processed data with respect to a reference surface may be better understood with reference to FIG. 6. FIG. 6 is illustrative of an example where 3D data for the same tool mark specimen is acquired twice, but in each case the tool mark surface is positioned on the acquisition mechanism with a different tilt. After the 3D data is pre-processed and the pre-processed data transformed into Cartesian coordinates, cross-sections of the data sets may be depicted as shown in FIG. 6, which depicts 2D cross-sectional representations for the sake of simplicity. Data 1 represents the data acquired for the tool mark the first time while Data 2 represents the data acquired for the tool mark the second time but at the different tilt. The difference in appearance of the data is due to the fact that each data set was taken with the tool mark surface tilted by a different angle. The objective to be accomplished by normalizing the Cartesian coordinate representations of the data is to correct for this discrepancy since, given that data for the same tool mark was acquired in both cases, the data generated for both data sets should be practically the same. An optimal reference surface is identified for the data under consideration and, for the example depicted by FIG. 6, the reference surface may be a line (labeled Baseline 1 and Baseline 2 in FIG. 6). Once the reference surface is identified, the data is projected onto the reference surface. In the example of FIG. 6, this involves rotating each of the data sets, i.e. Data 1 and Data 2, until their respective baselines, i.e. Baseline 1 and Baseline 2, are horizontal. Since this is done with both data sets, the transformed versions of the data sets would look identical. Projecting the data onto the reference surface is the most accurate way to complete the normalization process although other options are available. Options such as subtracting the reference surface or filtering the data could result in stretching/shrinking effects on the data, although these effects may in some cases be neglected if the tool mark under consideration is reasonably "flat".

Because the reference surface with respect to which the data is normalized depends on the type of tool mark under consideration, the data normalization process is most optimally closely related to the type of tool mark for which normalized data is being computed. In the case of striated tool marks on a cylindrical surface or object, e.g. a bullet, the normalization procedure should optimally take into account the cylindrical shape (unless deformed by impact) of the surface or object. A generic normalization approach is implemented by the normalization module 20 wherein the same basic algorithmic approach is used for all tool marks but the parameters used by the algorithms may be varied for different tool marks. One preferred generic normalization procedure implemented by software of the normalization module 20 involves second and first order leveling of the pre-processed data. In second order leveling, the data is leveled using a conventional second-order leveling algorithm. It is preferred that the second-order leveling algorithm implement a projection onto the optimally computed second order surface as opposed to subtracting the second order surface, which may introduce inaccuracies in the dimensionality of the data. First order leveling involves leveling the data using a conventional first order leveling algorithm. It is preferred that the first-order leveling algorithm implement a projection onto the optimally computed plane as opposed to subtracting the plane, which may introduce inaccuracies in the dimensionality of the data. It should be appreciated that the second and first order leveling operations can each be implemented separately or together in a single operation. Furthermore, in order to compensate for mechanical misalignments, the normalization module 20 applies the calibration parameters to the data being normalized as discussed above. As a result of the normalization process, normalized data will be generated and stored in the data unit 10 for tool marks of the questioned specimens and, if provided, the control specimens as seen in FIG. 1.

The acquisition, pre-processing and normalization procedures respectively performed by the acquisition module 14, the pre-processing module 16 and the normalization module 20 are the same for striated tool marks and for impressed tool marks. However, the signature generation process carried out by software of the signature generation module 22 will differ based on the type of tool mark under consideration. Slotted screwdrivers and tongue and groove pliers are examples of tools that create striated tool marks, and such tools may be referred to as striation-creating tools. In the case of tongue and groove pliers, striations may be created along two possible axes, parallel and perpendicular to the plier jaws. Bolt cutters, tongue and groove pliers, crimping tools and hammers are examples of tools that create impressed tool marks, and such tools may be referred to as impression-creating tools. Tongue and groove pliers, therefore, are representative of tools that can create both impressions and striations. The major difference between impressions and striations is that striated tool marks can be completely specified by their cross-section, so that they can be encoded as a one-dimensional vector and fully represented as a one-dimensional data set. On the other hand, a two-dimensional array is necessary to represent an impressed tool mark. Signature generation may thusly be considered two separate and independent processes, one corresponding to the generation of striated tool mark signatures and the other corresponding to the generation of impressed tool mark signatures.

Figure 7:
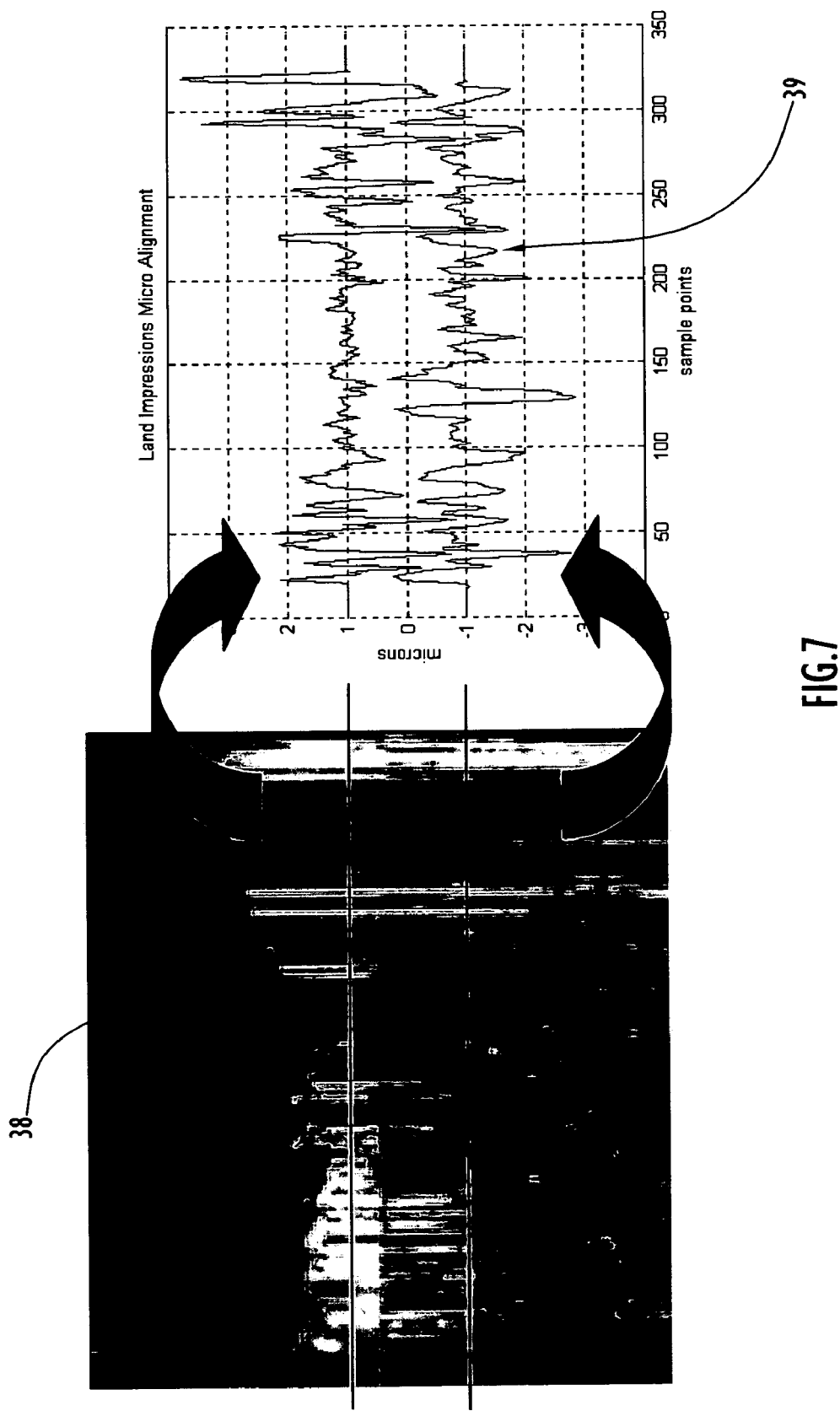
FIG. 7 depicts on the left a microphotographic image of a striated tool mark and depicts on the right a graphical characterization of the striated tool mark by its cross-section.
Figure 8:
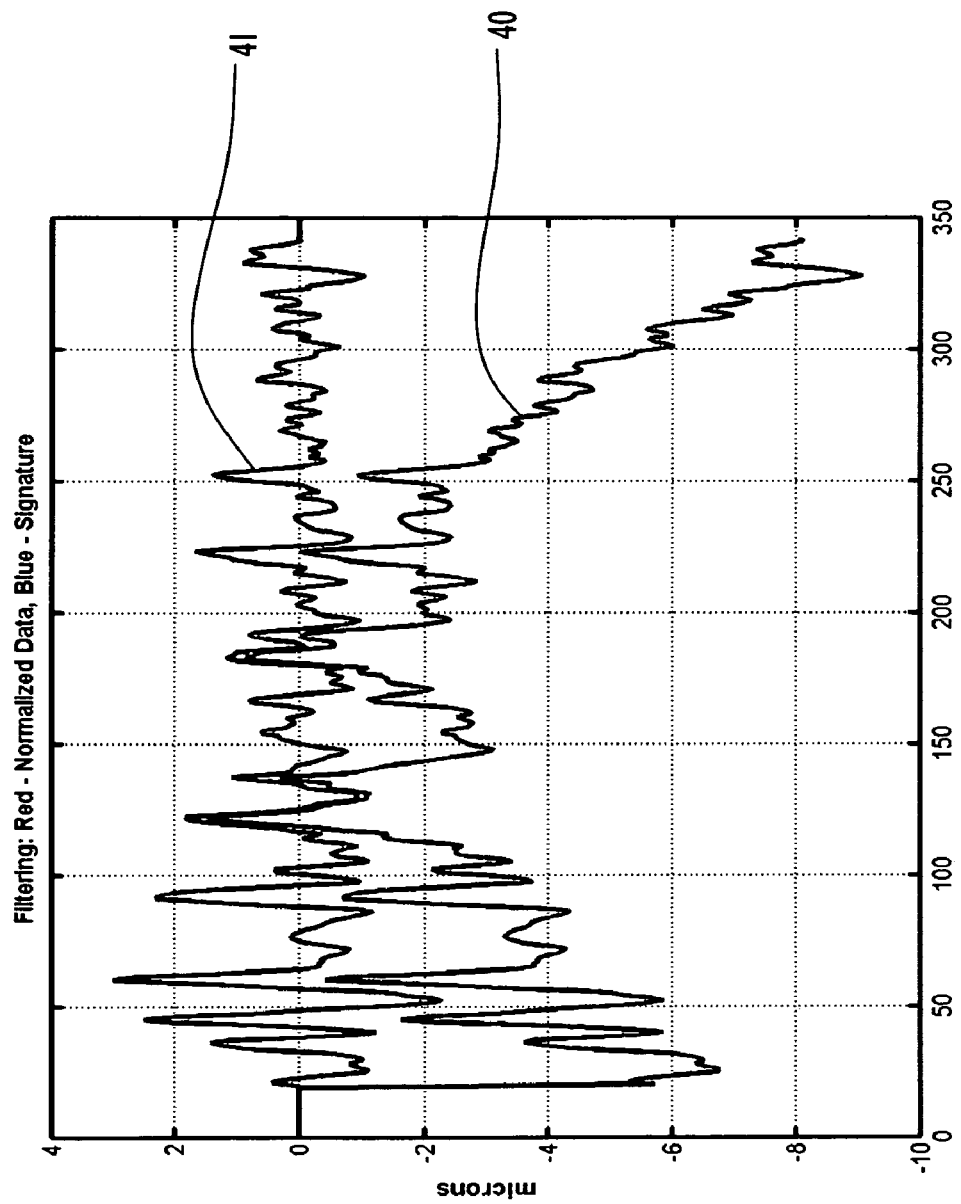
FIG. 8 is a graph depicting a profile and a signature for a striated tool mark.

The signature generation module 22 is responsible for isolating those features from the normalized data that best capture the individuality of the tool mark while discarding any elements that are common to all specimens. In order to take advantage of the constant cross-section property of striated tool marks which allows them to be represented as a one-dimensional data set, signature generation for a striated tool mark involves the signature generation module 22 applying an algorithm to the normalized data for the striated tool mark to accurately identify the direction of its striations. The algorithm used to identify the direction of the striations for a striated tool mark involves histogram equalization, local gradient estimation, identification of dominant gradient direction, identification of striation direction, projection of cross-section, and profile filtering. Histogram equalization involves histogram equalizing the normalized data to emphasize the contrast between depth values for the tool mark. Local gradient estimation involves estimating local gradients for every point of the histogram equalized data set, and local gradient estimation can be performed in a variety of conventionally known ways. Identification of dominant gradient direction involves identifying the dominant gradient direction from the estimated local gradients. If the tool mark surface is indeed striated, the dominant gradient direction will be perpendicular to the direction of the striations and, therefore, identification of striation direction involves identifying the direction of the striations perpendicular to that of the dominant gradient. Projection of cross-section involves projecting the striated tool mark onto a plane perpendicular to the direction of the striations, thereby creating a cross-section of the tool mark. As an example, FIG. 7 illustrates on the left the microphotographic image of a striated tool mark 38, and illustrates on the right a graphically represented cross-section 39 obtained from the tool mark 38. The cross-section of the tool mark may be referred to as a "profile" and is sufficient to characterize the tool mark. Profile filtering is the final step in the signature generation process for striated tool marks and involves band-pass filtering of the tool mark's profile resulting in a tool mark signature. FIG. 8 illustrates by way of example the distinctions between the profile 40 and the signature 41 for a striated tool mark constituting the striated surface of a land impression on a bullet. Notably, the profile 40 displays the curvature of the surface itself (the curvature of the bullet), which would be common to all bullets of the same caliber, whereas the signature 41 displays only the surface features which are unique to the land impression.

FIGS. 9A–9G illustrate plots of data acquired for a striated tool mark at various points in the data acquisition, pre-processing, normalization and signature generation processes described above. Plots such as these can be displayed in color on the monitor of the computer The value of a given data point along the z axis or, in other words, its depth, can be indicated by its color and/or color intensity. Dropout points can be indicated in a preselected solid color different from the colors used for depth indication. FIG. 9A is a photographic image of a plot of raw data acquired from the striated tool mark by the acquisition module 14. A few dropout data points are intermixed with the data, while a larger number of such data points are found on the right and left edges of the plot. FIG. 9B is a photographic image of a plot of the data following decimation by the pre-processing module 16 There is no significant difference between the plot of FIG. 9A and that of FIG. 9B. A noticeable difference would have been an indication of loss of data (although the absence of a discernible difference does not imply that data has not been lost). FIG. 9C is a photographic image of a plot of the data after all unreliable data points have been identified and interpolated. FIG. 9D is a photographic image of a plot of the data after undergoing second order leveling. FIG. 9E is a photographic image of a plot of the data after first order leveling. After the direction of the striations is identified as explained above, the data is rotated and is depicted by the photographic image of the plot of FIG. 9F. FIG. 9G is a graph of the profile cross-section computed from the rotated data. The profile cross-section of FIG. 9G is band-pass filtered to generate a signature (not shown) as demonstrated by the previous example of FIG. 8.

Figure 11:
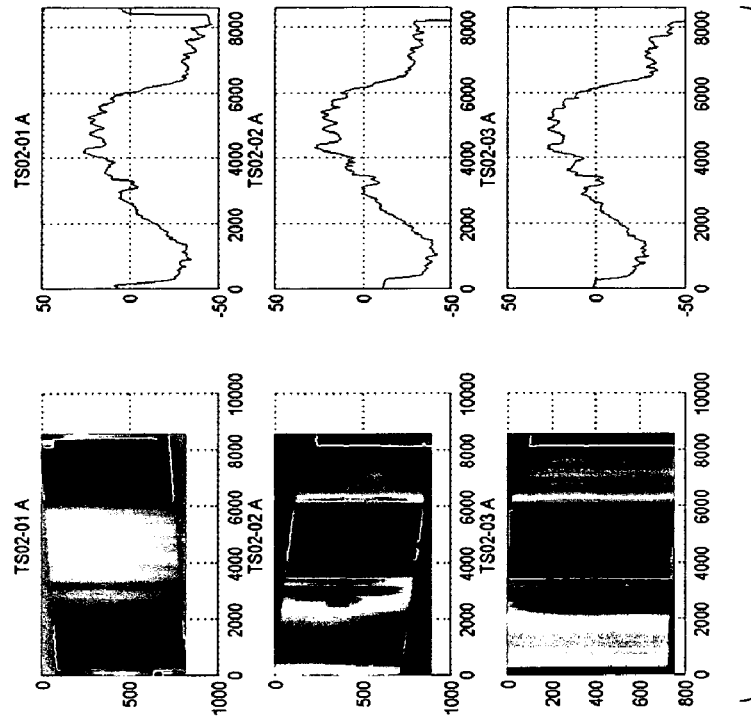
FIG. 11 illustrates on the left three photographic images depicting normalized data for three striated tool marks created by the same striation-creating tool, different from the striation-creating tool used to create the tool marks corresponding to the data and profiles of FIG. 10, and illustrates on the right three graphical representations depicting the profiles for the three toot marks created by the different striation-creating tool.
Figure 10:
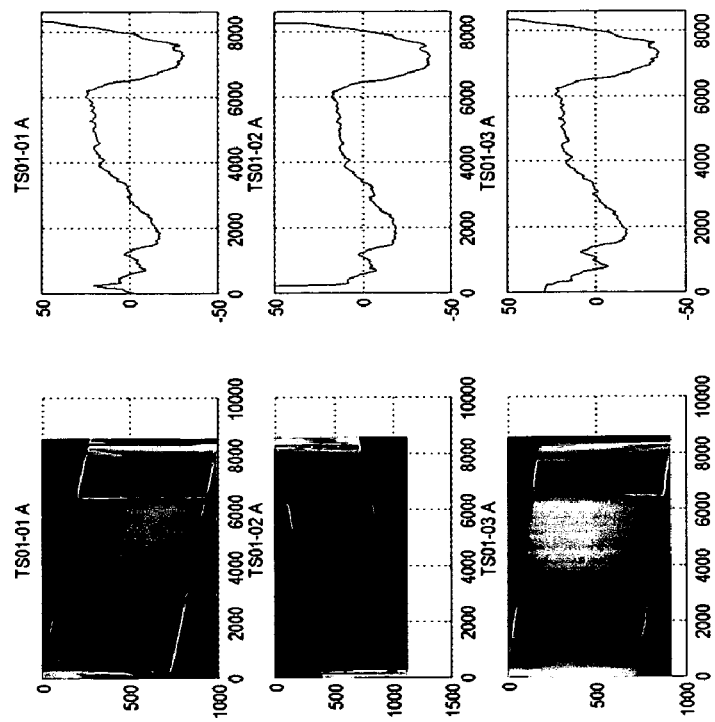
FIG. 10 illustrates on the left three photographic images depicting normalized data for three striated tool marks created by the same striation-creating tool, and illustrates on the right three graphical representations depicting the profiles for the three tool marks.
Figures 13A, 13B, 13C, 13D, 13E, 13F, 13G:
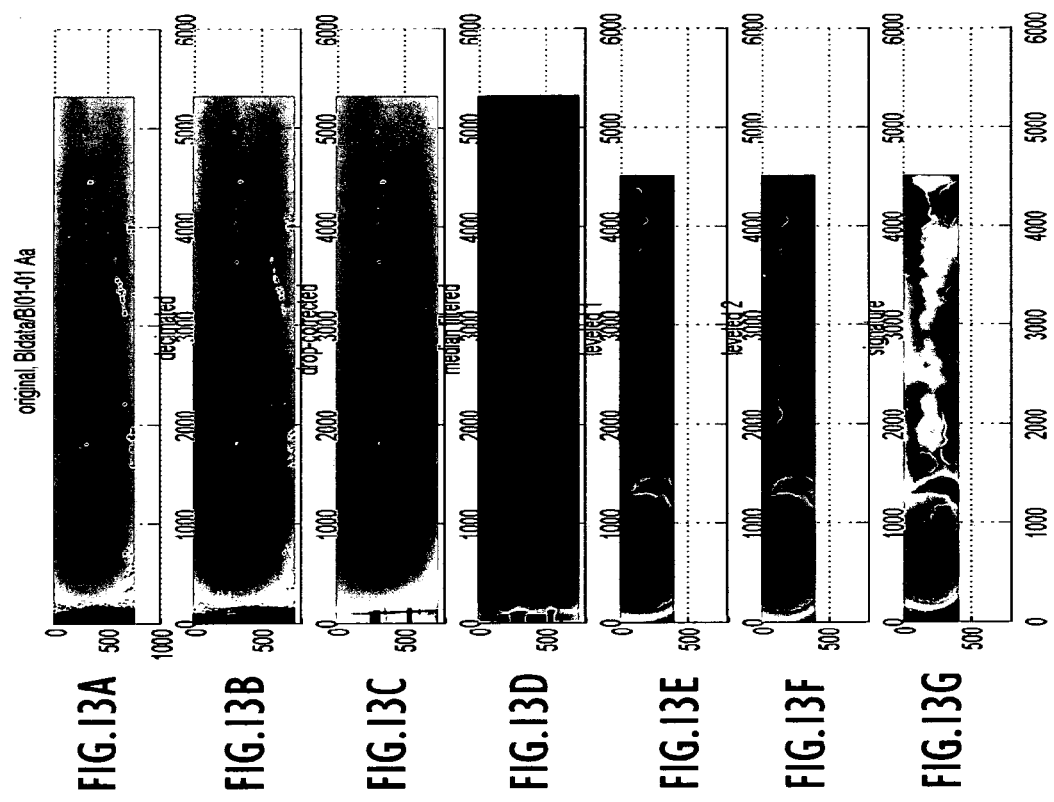
FIG. 13A is a photographic image depicting raw data acquired for a different impressed toot mark.
FIG. 13B is a photographic image depicting the raw data of FIG. 13A after decimation.
FIG. 13C is a photographic image depicting the data of FIG. 13B after unreliable data points have been identified and replaced with interpolated values.
FIG. 13D is a photographic image depicting the data of FIG. 13C after second and first order leveling.
FIG. 13E is a photographic image depicting a section of the data of FIG. 13D selected by the system as the most reliable.
FIG. 13F is a photographic image depicting the data of FIG. 13E after filtering.
FIG. 13G is a photographic image depicting the signature for the impressed tool mark obtained from the data of FIG. 13F.

As represented by FIGS. 10 and 11, the similarity of the profiles for striated tool marks created by the same tool and the difference between the profiles of striated tool marks created with different tools is often readily apparent even before the profile data is band-pass filtered. FIG. 10 illustrates data for three tool marks TS01-01 A, TS01-02 A and TS01-03 A created by a tongue and groove pliers TS01, and FIG. 11 illustrates data for three tool marks TS02-01 A, TS02-02 A and TS02-03 A created by a tongue and groove pliers TS02 different from the tongue and groove pliers TS01. For each tool mark TS01-01 A, TS01-02 A, TS01-03 A, TS02-01 A, TS02-02 A, and TS02-03 A, two types of data is shown. On the left in each of FIGS. 10 and 11 there are three photographic images depicting normalized data for each tool mark after being rotated so that the striations are vertical. On the right in each of FIGS. 10 and 11 there are three graphical representations of the profile data computed from the corresponding normalized data. Like the data depicted in FIGS. 9A–9G, the data shown on the left in FIGS. 10 and 11 would be capable of being displayed on the monitor of the computer in various colors and/or color intensities indicative of depth and dropped points. In the data shown on the left in each of FIGS. 10 and 11, different colors can be used to indicate the depth of the data points as well as dropped data points. The similarity of the profiles for the three tool marks TS01-01 A, TS01-02 A and TS01-03 A created by the tongue and groove pliers TS01 is quite apparent, and the similarity of the profiles for the three tool marks TS02-01 A, TS02-02 A and TS02-03 A created by the tongue and groove pliers TS02 is also quite apparent. On the other hand, the profiles for the tool marks created by the tongue and groove pliers TS01 are noticeably different from the profiles created by the tongue and groove pliers TS02. The data depicted in FIGS. 10 and 11 indicates a strong similarity between the tool marks created by the same tool and indicates a marked dissimilarity between the tool marks created by different tools of the same class characteristics, i.e. tongue and groove pliers, or even the same manufacture. The data depicted in FIGS. 10 and 11 thusly supports the concept of "individuality" of tool marks created with tools of the same class characteristics (or manufacture) as explained further below.

Figures 12A, 12B, 12C, 12D, 12E, 12F, 12G:
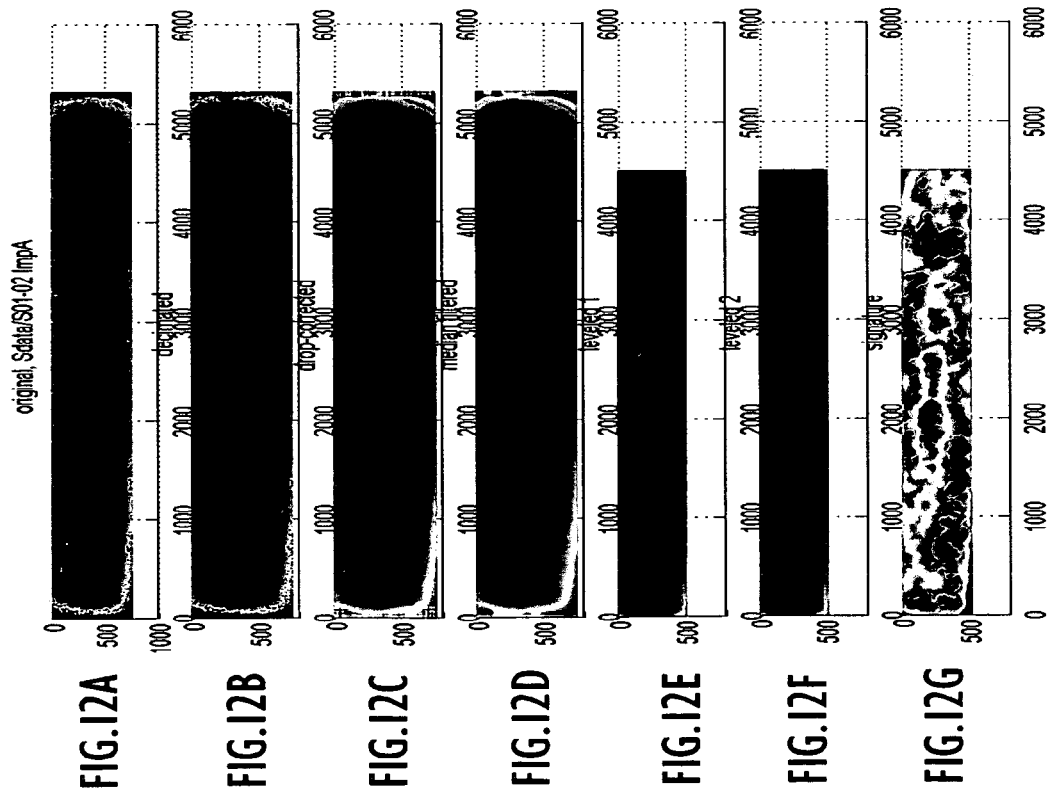
FIG. 12A is a photographic image depicting raw data acquired for an impressed tool mark.
FIG. 12B is a photographic image depicting the raw data of FIG. 12A after decimation.
FIG. 12C is a photographic image depicting the data of FIG. 12B after unreliable data points have been identified and replaced with interpolated values.
FIG. 12D is a photographic image depicting the data of FIG. 12C after second and first order leveling.
FIG. 12E is a photographic image depicting a section of the data of FIG. 12D selected by the system as the most reliable.
FIG. 12F is a photographic image depicting the data of FIG. 12E after filtering.
FIG. 12G is a photographic image depicting the signature for the impressed tool mark obtained from the data of FIG. 12F.

The signature generation process performed by the software of the signature generation module 22 for impressed tool marks is similar to that described above for striated tool marks but without the algorithm for identification of the direction of striations. In addition, since impressed tool marks cannot be characterized as a one-dimensional vector, the signature generation process performed by the signature generation module 22 for impressed tool marks creates a data set contained in a two-dimensional array or data set. In the case of impressed tool marks, the data set resulting from second and first order leveling in the data normalization process described above is band-pass filtered to obtain the signature for the impressed tool mark. FIGS. 12A–12G are photographic images of plots of data acquired for an impressed tool mark S01-02 Imp A created by a screwdriver S01, the plots of FIGS. 12A–12G illustrating the data at various points in the data acquisition, pre-processing, normalization and signature generation processes described above. Like the data plots of FIGS. 9A–9G, 10 and 11, data plots like those of FIGS. 12A–12G can be presented as a multi-color display on the monitor of the computer with different colors and/or color intensities being used to indicate depth and dropped data points. FIG. 12A depicts the raw 3D data as it is acquired by the acquisition module 14. FIG. 12B depicts the same data set after decimation. No loss of data is apparent. FIG. 12C depicts the data after dropout and outlier data points have been identified and replaced by interpolated estimates. FIG. 12D illustrates the data after second and first order leveling. FIG. 12E illustrates the section of the data selected by the system as the most reliable, i.e. having the least number of unreliable data points based on the information regarding unreliable data points previously gathered for interpolation of the unreliable data points. Notably, some of the data at the borders of the plot has been discarded. FIG. 12F shows the data after low-pass filtering to decrease the amount of noise followed by high-pass filtering to emphasize the features that are unique to the tool mark. The data set depicted in FIG. 12G constitutes the signature for the impressed tool mark. FIGS. 13A–13G are photographic images depicting data at the same stages in the data acquisition, pre-processing, normalization and signature generation processes shown and described for FIGS. 12A–12G, but the data depicted in FIGS. 13A–13G is acquired from an impressed tool mark B01-01 Aa created by a bolt cutter B101.

Figures 14, 15:
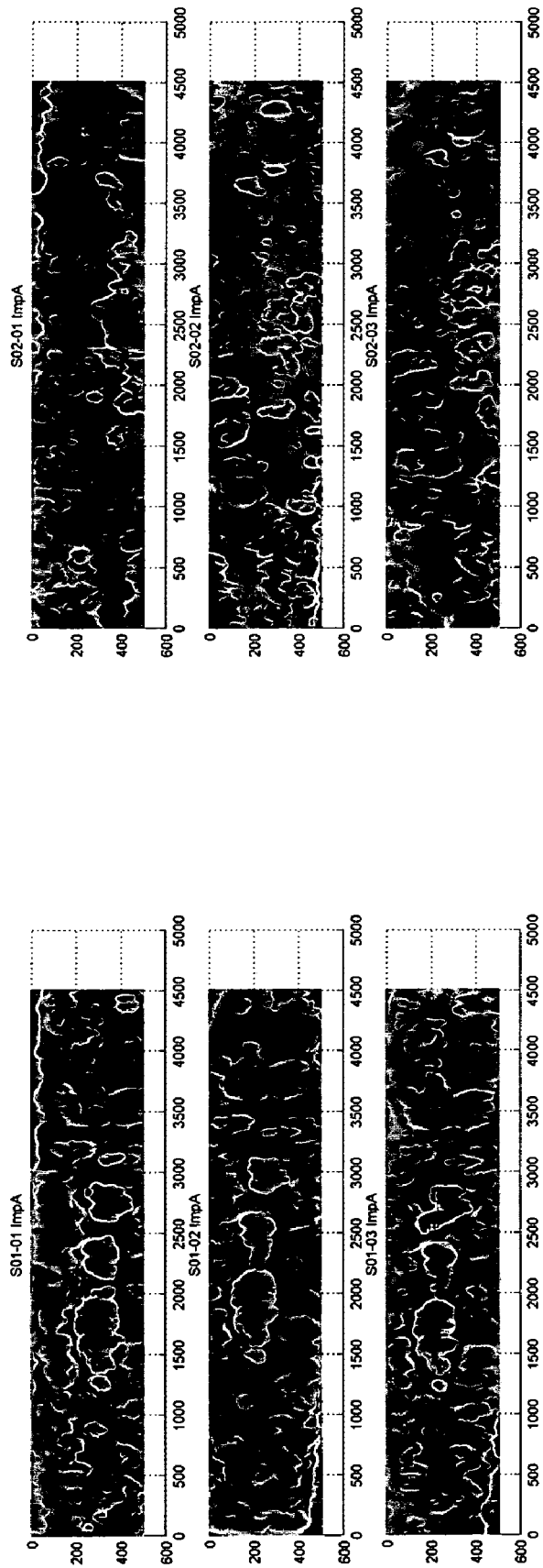
FIG. 14 shows three photographic images depicting the signatures for three impressed tool marks created by the same impression-creating tool.
FIG. 15 shows three photographic images depicting the signatures for three impressed tool marks created by the same impression-creating tool, different from the impression-creating tool used to create the tool marks corresponding to the signatures of FIG. 14.

FIG. 14 illustrates three photographic images depicting the signatures for three impressed tool marks S01-01 ImpA, S01-02 ImpA and S01-03 ImpA created by a screwdriver S01, and FIG. 15 illustrates three photographic images depicting the signatures for three impressed tool marks S0-01 ImpA, S02-02 ImpA, and S02-03 ImpA created by a screwdriver S02 different from the screwdriver S01. The signatures of FIGS. 14 and 15, are derived as explained above for the impressed tool mark of FIGS. 12A–12G, with different colors and/or color intensities being used to designate depth and dropped data points. The similarity of the signatures for the three impressed tool marks S01-01 ImpA, S01-02 ImpA and S01-03 ImpA created by the screwdriver S01 is readily apparent, and the similarity of the signatures for the three impressed tool marks S02-01 ImpA, S02-02 ImpA, and S02-03 ImpA created by the screwdriver S02 is also quite apparent. On the other hand, the signatures for the three tool marks created by the screwdriver S01 are noticeably different from the signatures for the three tool marks created by the second screwdriver S02.

Figure 17:
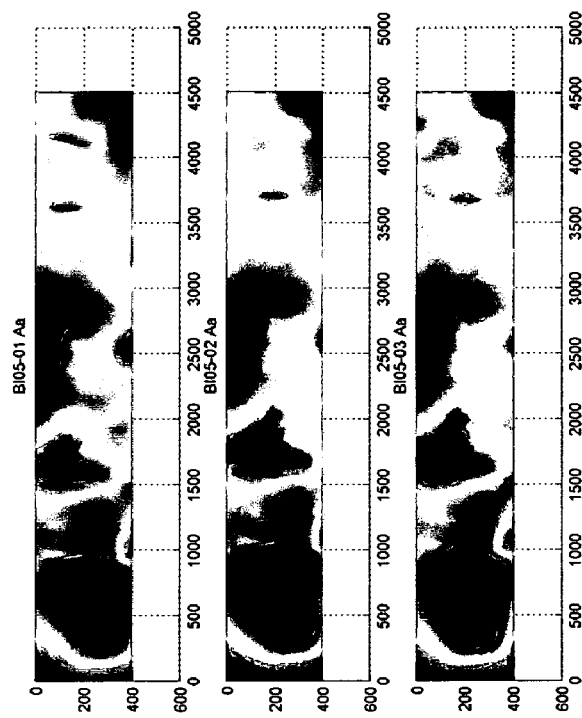
FIG. 17 shows three photographic images depicting the signatures for three impressed tool marks created by the same bolt cutter, different from the bolt cutter used to create the tool marks corresponding to the signatures of FIG. 16.
Figure 16:
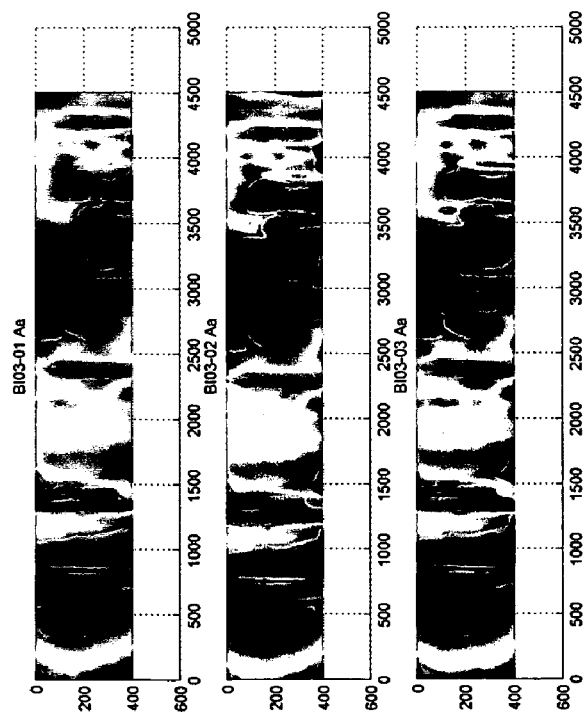
FIG. 16 shows three photographic images depicting the signatures for three impressed tool marks created by the same bolt cutter.

A similar example is demonstrated by a comparison of FIGS. 16 and 17, but for tool mark signatures obtained from impressed tool marks created by different bolt cutters. FIG. 16 illustrates three photographic images depicting the signatures for three impressed tool marks B103-01 Aa, B103-02 Aa and B103-03 Aa created by a bolt cutter B103, and FIG. 17 illustrates three photographic images depicting the signatures for three impressed tool marks B105-01 Aa, B105-02 Aa and B105-03 Aa created by a bolt cutter B105 different from the first bolt cutter B103. Again, the similarity of the signatures for the three impressed tool marks B103-01 Aa, B103-02 Aa and B103-03 Aa created by the bolt cutter B103 is readily apparent, and the similarity of the signatures for the three impressed tool marks B105-01 Aa, B105-02 Aa and B105-03 Aa created by the bolt cutter B105 is also readily apparent. On the other hand, the signatures for the impressed tool marks created by the bolt cutter B103 are noticeably different from the signatures for the impressed tool marks created by the bolt cutter B105. The results demonstrated by FIGS. 14, 15, 16 and 17 for impressed tool marks are consistent with the results demonstrated by FIGS. 10 and 11 for striated tool marks and support the concept of "individuality" of impressed tool marks created by tools of the same class characteristics, or the same manufacture. Namely, the signatures for impressed tool marks created by the same tool are significantly similar whereas the signatures for impressed tool marks created by different tools of the same class characteristics (or manufacture) are significantly dissimilar.

Once the signatures for the tool mark specimens have been generated by the signature generation module 22, the signatures are stored in the appropriate database 24 or 26. The questioned signatures database 24 contains the tool mark signatures for the questioned specimens whose signatures and tool marks are of unknown origin and were acquired for the purpose of identifying their origin. The control signatures database 26 contains the tool mark signatures for the control specimens whose signatures and tool marks are of known origin. Control specimens are grouped by class characteristics. The analysis unit 12, shown in FIG. 2, utilizes the tool mark signatures stored in the databases 24 and 26 to quantify the statistical difference between known matching and known non-matching tool marks. The analysis unit 12 includes software capable of computing a numerical value reflecting the degree of similarity between two tool marks, of providing a statistically based assessment of the likelihood that the same tool created a pair of tool marks under consideration and/or of providing an assessment of uniqueness of tool marks of the same class characteristics. The analysis unit 12 performs its functions via a computation module 42, a classifier module 44, and a uniqueness evaluator module 46.

The computation module 42 is responsible for the quantification or parameterization of the degree of similarity between pairs of tool mark specimens, i.e. between two given tool mark signatures. This parameterization is achieved by the application of a well-defined similarity metric to the signatures of the specimen pair under comparison via software of the computation module 42. The effectiveness of the similarity metric depends upon its ability to differentiate pairs of specimens of common origin (matching) and pairs of specimens of different origin (non-matching). The computation module 42 computes similarity values for pairs of the questioned tool mark signatures in the questioned signatures database 24, resulting in questioned similarity values 57. Each pair of questioned tool mark signatures that undergoes comparison will be associated with a similarity value computed by the computation module for that pair of signatures. If control tool mark signatures are available, the computation module 42 similarly computes similarity values for pairs of the control tool mark signatures of database 26, resulting in control or reference similarity values 58. The questioned similarity values and the reference similarity values are stored in a similarity values database 48.

The detail needed in order to quantify the degree of similarity between two given tool mark signatures will depend on whether the tool marks under consideration are striated tool marks or impressed tool marks. A number of options are available for a suitable similarity metric, both in the time-domain, frequency-domain, wavelet domain or other transformed spaces (absolute distance, relative distance, correlation coefficients, principle component analysis, etc.). The final choice for a similarity metric may be a compromise of accuracy and computational requirements.

In a preferred embodiment, the following similarity metric may be implemented by the computation module 42 for the signatures of a pair of striated tool marks:

$$Sim(a, b) = \max_{|\Delta x| < \Delta x_{max}} \left[ 1 - \frac{\|l_1(x + \Delta X) - l_2(x)\|^2}{\|l_1(x + \Delta x) + l_2(x)\|^2} \right]$$

where $l_1$ and $l_2$ correspond to two zero-mean one-dimensional signature vectors associated with the striated tool marks, the norm $\|\bullet\|$ corresponds to the Euclidean norm:

$$\|l\| = \sqrt{\Sigma l_i^2}$$

and $\Delta x_{max}$ is a maximum amount of lateral displacement allowed for comparison. The maximum correlation is found empirically by displacing (shifting) one tool mark signature data set with respect to the other by $\Delta x$. This shift is necessary because there is no guarantee that the initial point where data was taken for one tool mark is the same as that of the other. This similarity metric may be referred to as a "relative distance metric." The relative distance metric is a time-domain similarity metric, and it offers advantages in terms of being suited to deal with tool mark signatures of different lengths, as well as signatures with missing data points (e.g., dropped points, outliers, etc.).

Figure 19:
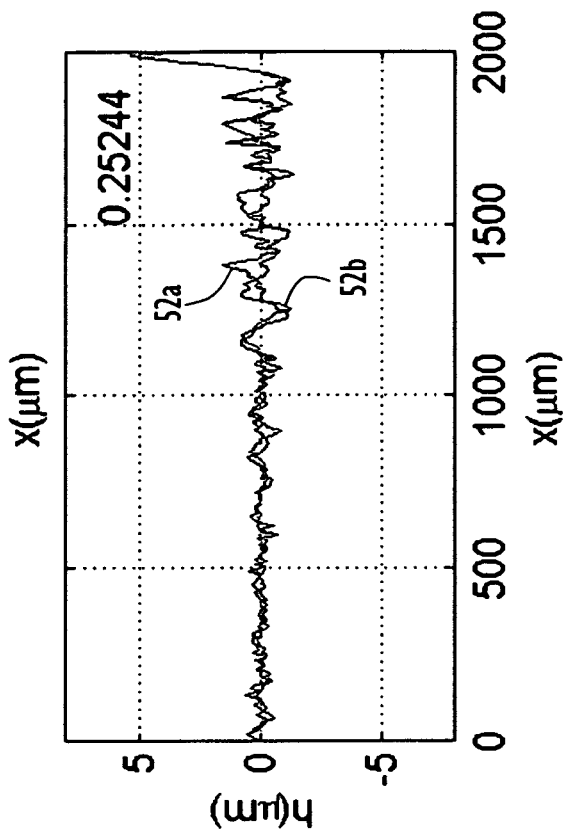
FIG. 19 is a graph illustrating comparison of a pair of non-matching striated tool mark signatures and shows the similarity value obtained from evaluation of their similarity metric.
Figure 18:
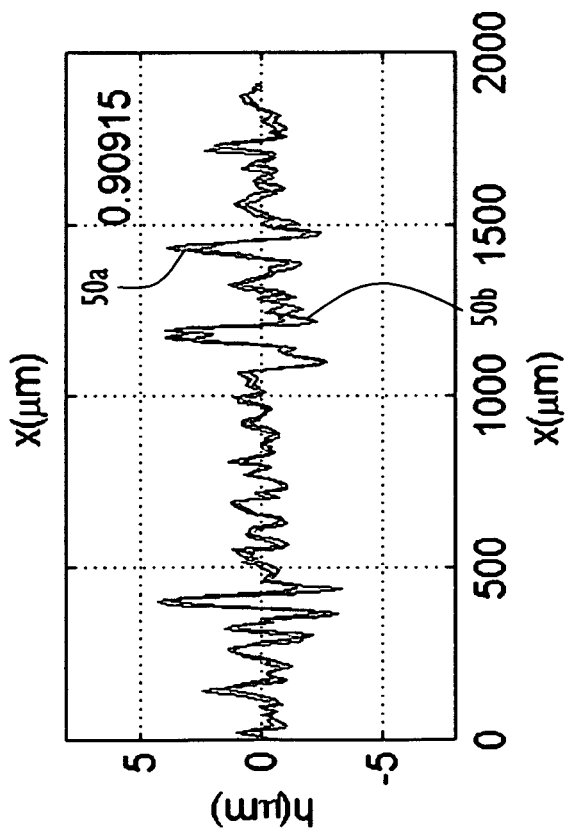
FIG. 18 is a graph depicting comparison of a pair of matching striated tool mark signatures and shows the similarity value resulting from evaluation of their similarity metric.

FIG. 18 depicts the results obtained from application of the above-described relative distance similarity metric to a pair of matching tool mark signatures 50a,50b for striated tool marks, with a similarity value (similarity metric value) of 0.90915 being obtained. FIG. 19 depicts the results obtained from application of the same similarity metric to a pair of non-matching tool mark signatures 52a,52b for striated tool marks, with a similarity value of 0.25244 being obtained. Results such as those exemplified by FIGS. 18 and 19 can be displayed on the monitor of the computer system. There is a clear difference between the similarity metric values for the matching tool mark signatures and the non-matching tool mark signatures. Notably, the similarity value for the matching tool mark signatures 52a, 52b is significantly higher than the similarity value for the non-matching tool mark signatures 52a, 52b, out of a maximum expected similarity value of 1.0. It should be appreciated that the relative distance similarity metric described above represents one option for a similarity metric that may be used to obtain a numerical similarity value for the signatures of striated tool marks and that other similarity metrics can be successfully implemented for the signatures of striated tool marks to provide a similarity value for each pair of striated tool mark signatures under comparison.

An even greater variety of options are available for the similarity metric for the tool mark signatures of impressed tool marks than are available for the signatures of striated tool marks. Most of these options may be considered generalizations of those used for striated tool mark signatures. However, since the amount of data required to describe impressed tool marks is considerably greater than that required to characterize striated tool marks, the similarity metric selected for impressed tool marks should not require unreasonably time consuming computations. One approach to overcoming the computational problem is to transition to a frequency domain-based similarity metric for impressed tool mark signatures. An alternative approach to the frequency domain-based similarity metric for the signatures of impressed tool marks is a multi-resolution approach involving the computation of similarity metrics between two impressed tool mark signatures at different resolutions. The low-resolution versions of the signatures are used to estimate the optimal $\Delta x$, $\Delta y$ and $\Delta \theta$ shifts, and these estimates are adjusted using sequentially higher-resolution versions of the signatures until an optimal $\Delta x$, $\Delta y$ and $\Delta \theta$ shift is obtained. An advantage of the multi-resolution approach is that it speeds up the time required to compute the similarity metric for a pair of impressed tool marks undergoing comparison.

In a preferred embodiment, a frequency domain-based similarity metric is implemented by software of the computation module 42 to obtain a similarity value for pairs of impressed tool mark signatures undergoing comparison and involves a 2D extension of the statistical correlation coefficient. The correlation coefficient is computed for a discrete number of misalignment angles $\Delta \theta$ where, for each of these angles $\Delta \theta$, the optimal offset between the tool mark signatures under consideration is computed using a frequency domain approach by taking advantage of the relationship between the product of frequency domain data and the convolution of time domain data. The similarity value is defined as the maximum of the correlation values for all misaligned angles $\Delta \theta$. The estimate of the optimal relative rotation between the tool mark signatures can be improved using an optimization approach (line search). Other frequency domain approaches could be utilized in the computation module 42. The frequency domain approach used in the preferred embodiment is described in greater detail below.

The correlation between two signals (cross correlation) is a standard conventional approach to feature detection as well as a component of more sophisticated techniques. Textbook presentations of correlation describe the convolution theorem and the attendant possibility of efficiently computing correlation in the frequency domain using the fast Fourier transform. Unfortunately, the normalized form of correlation (correlation coefficient), preferred in template matching, does not have a correspondingly simple and efficient frequency domain expression. For this reason, it has been proposed to compute normalized cross correlation (NCC) in the spatial domain. Due to the computational cost of spatial domain convolution, several inexact but fast spatial domain matching methods have also been developed. An algorithm for obtaining normalized cross correlation from transform domain convolution has been developed. The algorithm in some cases provides an order of magnitude speedup over spatial domain computation of normalized cross correlation.

The use of cross correlation for template matching is motivated by the distance measure (squared Euclidean distance):

$$d_{f,t}^2(u, v) = \sum_{x,y} [f(x, y) - t(x - u, y - v)]^2$$

(where f is the image and the sum is over x,y under the window containing the feature t positioned at u,v). In the expansion of d2, $$d_{f,t}^2(u, v) = \sum_{x,y} [f^2(x, y) - 2f(x, y)t(x - u, y - v) + t(x - u, y - v)^2]$$

the term $\Sigma t(x-u,y-v)^2$ is constant. If the term $\Sigma f(x,y)^2$ is approximately constant then the remaining cross-correlation term $$c(u, v) = \sum_{x,y} f(x, y)t(x - u, y - v)^2 \qquad \text{(Equation 1)}$$

is a measure of the similarity between the image and the feature.

There are several disadvantages to using Equation 1 for template matching. If the image energy $\Sigma f(x,y)^2$ varies with position, matching using Equation 1 can fail. For example, the correlation between the feature and an exactly matching region in the image may be less than the correlation between the feature and a bright spot. Another disadvantage relates to the range of c(u,v) being dependent on the size of the feature. A further disadvantage is that Equation 1 is not invariant to changes in image amplitude such as those caused by changing lighting conditions across the image sequence.

In normalized cross correlation (NCC), the correlation coefficient overcomes the aforementioned disadvantages of cross correlation by normalizing the image and feature vectors to unit length, yielding a cosine-like correlation coefficient $$\gamma(u, v) = \frac{\sum_{x,y} f(x, y) t(x-u, y-v)}{\left\{ \sum_{x,y} [f(x, y) - \bar{f}_{u,v}]^2 \sum_{x,y} [t(x-u, y-v) - \bar{t}]^2 \right\}^{0.5}}$$ (Equation 2)

Where $\bar{t}$ is the mean of the feature and $\bar{f}_{u,v}$ is the mean of f(x,y) in the region under the feature. Equation 2 is referred to as the normalized cross correlation. Although it is well known that cross correlation can be efficiently implemented in the transform domain, the normalized form of cross correlation (NCC) preferred for feature matching applications does not have a simple frequency domain expression. Normalized cross correlation has been computed in the spatial domain for this reason.

Fast normalized cross correlation (FNCC) can best be understood by considering the numerator in Equation 2 and assuming images f'(x,y)≡f(x,y)−$\bar{f}_{u,v}$ and t'(x,y)≡t(x,y)−$\bar{t}$ in which the mean value has already been removed:

$$\gamma^{num}(u, v) = \sum_{x,y} f'(x, y) t'(x-u, y-v)$$ (Equation 3)

For a search window of size $M^2$ and a feature of size $N^2$, Equation 3 requires approximately $N^2 (M-N+1)^2$ additions and $N^2 (M-N+1)^2$ multiplications. Equation 3 is a convolution of the image with the reversed feature t'(−x,−y) and can be computed by the fast Fourier transform (FFT):

$$F^{-1}\{F(f')F^*(t')\}$$ (Equation 4)

where F is the Fourier transform, and the complex conjugate accomplishes reversal of the feature via the Fourier transform property Ff*(−x)=F*(ω).

Implementations of the fast Fourier transform (FFT) algorithm generally require that f' and t' be extended with zeros to a common power of two. The complexity of the transform computation (Equation 3) is then 12 $M^2 \log_2 M$ real multiplications and 18 $M^2 \log_2 M$ real additions/subtractions. When M is much larger than N, the complexity of the direct "spatial" computation (Equation 3) is approximately $N^2M^2$ multiplications/additions, and the direct method is faster than the transform method. The transform method becomes relatively more efficient as N approaches M and with larger M,N. There are several well known "fast" convolution algorithms that do not use transform domain computation. These approaches fall into two categories: algorithms that trade multiplications for additional additions, and approaches that find a lower point on the O($N^2$) characteristic of one-dimensional convolution by embedding sections of a one-dimensional convolution into separate dimensions of a smaller multidimensional convolution. While faster than direct convolution these algorithms are nevertheless slower than transform domain convolution at moderate sizes and in any case they do not address computation of the denominator of Equation 2.

Figure 20B:
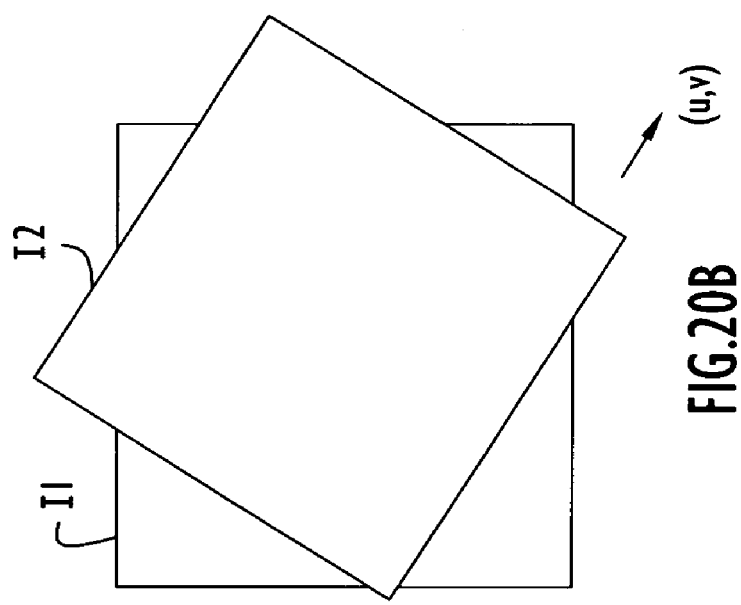
FIG. 20B represents rotated image shifting for tool mark signature comparisons.
Figure 20A:
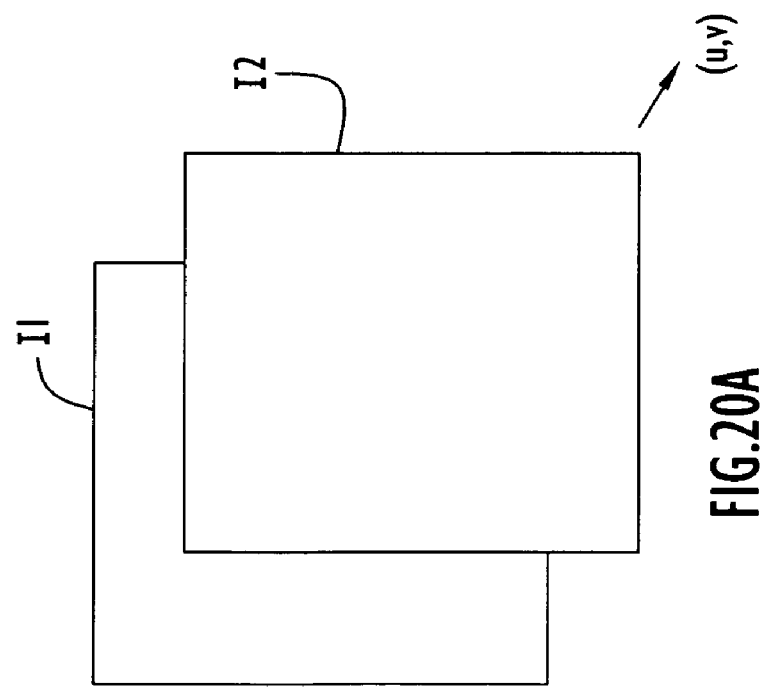
FIG. 20A represents linear image shifting in Fast Normalized Cross Correlation (FNCC).

Normalized cross correlation (NCC) is a mathematical computation that fulfills an essential role in image processing. Other than for template matching and image registration, normalized cross correlation (NCC) has also been used extensively in machine vision for industrial inspection including defect detection in complicated images. However, this technique is designed to handle the image matching with a linear shifting (u,v). In the case of tool mark signature comparison, besides the linear shifting, one more freedom of image rotation must be taken into account. An illustration of linear shifting and rotation is shown in FIGS. 20A and 20B. FIG. 20A shows the overlapping region for two images I1 and I2 with image linear shifting as used in fast normalized cross correlation (FNCC). FIG. 20B illustrates rotated image shifting for comparison of two tool mark signatures wherein one image I2 is rotated relative to the other image I1. The imaging matching processing becomes much more complicated and extremely time consuming at computation due to the following reasons. Firstly, the overlapping of two images I1 and I2 is no longer a rectangle shape as seen from FIG. 20B but, rather, a polygonal shape. To register the new polygon boundaries and apply fast normalized cross correlation (FNCC) to a polygon region takes much more computational effort. Secondly, since most pixels in the rotated image I2 will no longer be aligned with the feature pixels, an interpolation might be used to recreate the image data. However, interpolating an image always involves intensive computation, which would further add to the computational burden. To overcome those obstacles and shorten computing time, the automated system and method for tool mark analysis employ a unique algorithm, which may be referred to as an improved fast normalized cross correlation (IFNCC) algorithm, to accelerate the processing for image comparison, i.e. for tool mark signature comparison, performed by the computation module 42.

Figure 21C:
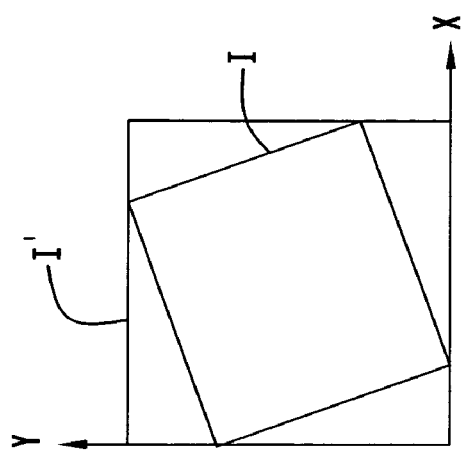
FIG. 21C illustrates a new matrix that contains the entire rotated image matrix of FIG. 21B.
Figure 21B:
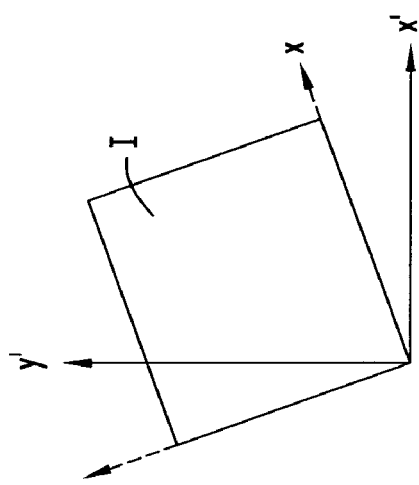
FIG. 21B illustrates the image matrix of FIG. 21A after rotation.
Figure 21A:
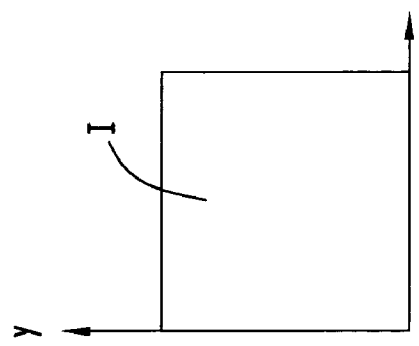
FIG. 21A illustrates the original image matrix prior to rotation.

The improved fast normalized cross correlation (IFNCC) algorithm incorporates a fast approach to accomplish image rotation. First, the image is rotated at a demanded angle with updated (x',y') coordinate locations for all pixels. These new (x',y') coordinates can be computed quickly from the vectors that register locations (x,y) of each pixel converted from the original matrix. Second, a new zero matrix that has a size to hold all rotated image is created, and then each pixel with (x',y') coordinates is mapped to the nearest location in the new matrix. Meanwhile, another similar new matrix, with all the values within the boundaries of the embedded image being "1", is created as a mask for further usage. An illustration of this image rotation processing is shown in FIGS. 21A, 21B and 21C. FIG. 21A depicts the original image matrix I. FIG. 21B depicts the image matrix I rotated and shows the coordinates (x',y'). FIG. 21C depicts the entire rotated matrix I embedded or contained within the new matrix I' that is created as the mask.

For image cross correlation, only linear shifting in both x and y directions is involved. The first step is to make two image matrixes to have the same size by padding zeros outsides. The new matrix dimensions are first calculated from the factor of a given maximum shifting allowed and then rounded up to the ceiling integer of power of two. This round-up is necessary because the 2D discrete fast Fourier transform (FFT) algorithm can be easily applied to these two matrixes. Two images' spatial convolution of the numerator of NCC in Equation 2 is now easily implemented with fast Fourier transform of Equation 4. No special caution has been taken to the overlapping boundaries because the padded zeros will automatically trim data outside the boundaries. However, this is not the case for computing the denominators of (NCC) in Equation 2. As explained above for the creation of similar mask matrixes that replace all pixel values with one, the boundary issue for each denominator in Equation 2 is solved by trimming one image data with the help of another image's mask matrix. To complete the convolutions for both numerator and denominators in Equation 2, inverse 2D Fourier transforms are applied to convert back the products of transformed images in frequency domain. The elimination of rows and columns of zeros, and the trimming of the correlation to relevant maximum shift range are then implemented. Further treatment of zeros in the denominator products as well as the numerator are accomplished before the normalized cross correlation (NCC) matrix is finally computed. The peak NCC value and relevant shifting positions in both x and y directions are then determined.

The approaches and algorithms of image rotation and correlation described above are used iteratively by the computation module 42 for image comparison, i.e. tool mark signature comparison. Once start and finish angles are given for image comparison, the computation module 42 automatically executes image, i.e. tool mark signature, rotation first and cross correlation second to find the maximum correlation coefficient between two tool mark signatures at a given angle. Then the rotation angle moves to the next position and the processing repeats all over again. When cross correlations at every angle are computed, the best matching value as well as its relevant rotation angle and shifting position are determined. The results are summarized and reported via the computer, such as via monitor display and/or print-out.

Figure 22:
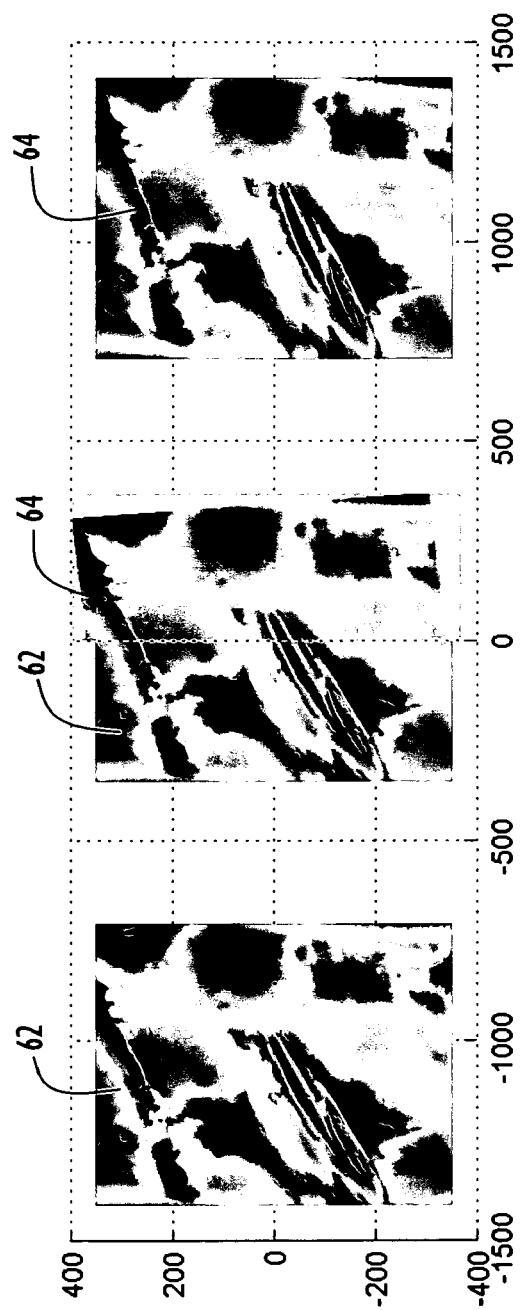
FIG. 22 illustrates on the left a first photographic image depicting a first tool mark signature, illustrates on the right a second photographic image depicting a second tool mark signature, and illustrates in the center the left side of the first image and the right side of the second image to demonstrate Improved Fast Normalized Cross Correlation (IFNCC) for tool mark image matching as implemented by the automated system and method for tool mark analysis.
Figure 23:
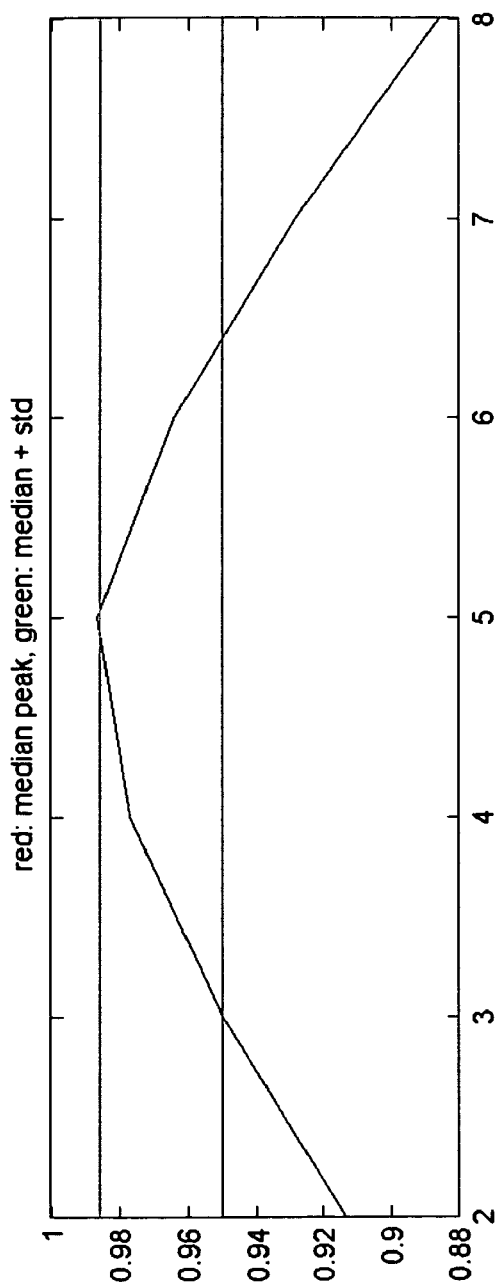
FIG. 23 is a graph depicting the best cross correlation values at each rotation angle for the tool mark image matching of FIG. 22.

FIG. 22 demonstrates the application of improved fast normalized cross correlation (IFNCC) in the comparison of two tool mark signature images. The tool mark signature 62 whose photographic image is illustrated on the left in FIG. 22 was acquired from a tool mark specimen, and the tool mark signature 64 whose photographic image is illustrated on the right in FIG. 22 was acquired from another tool mark specimen. The two images for comparison were taken from the same position. FIG. 22 shows the results of cross correlation for the two image comparison. The tool mark signature 62 on the left and the tool mark signature 64 on the right in FIG. 22 are the two original images. The image in the center of FIG. 22 comprises two halves: the left half from the left tool mark signature 62, and the right half from the right tool mark signature 64, which has been vertically shifted and rotated for matching with the left half of tool mark signature 62. The plot depicted in FIG. 23 depicts the best cross correlation values for the tool mark signatures 62 and 64 at each rotation angle. In this example, rotation angle at zero gives the highest correlation value, or the best image matching at point 66. The line 68 represents the median and standard deviation. The line 70 represents the median peak. FIG. 24 is an example of the results from batch comparisons between five tool mark signatures that were acquired from the same position with a fixed 20× lens.

Figure 26:
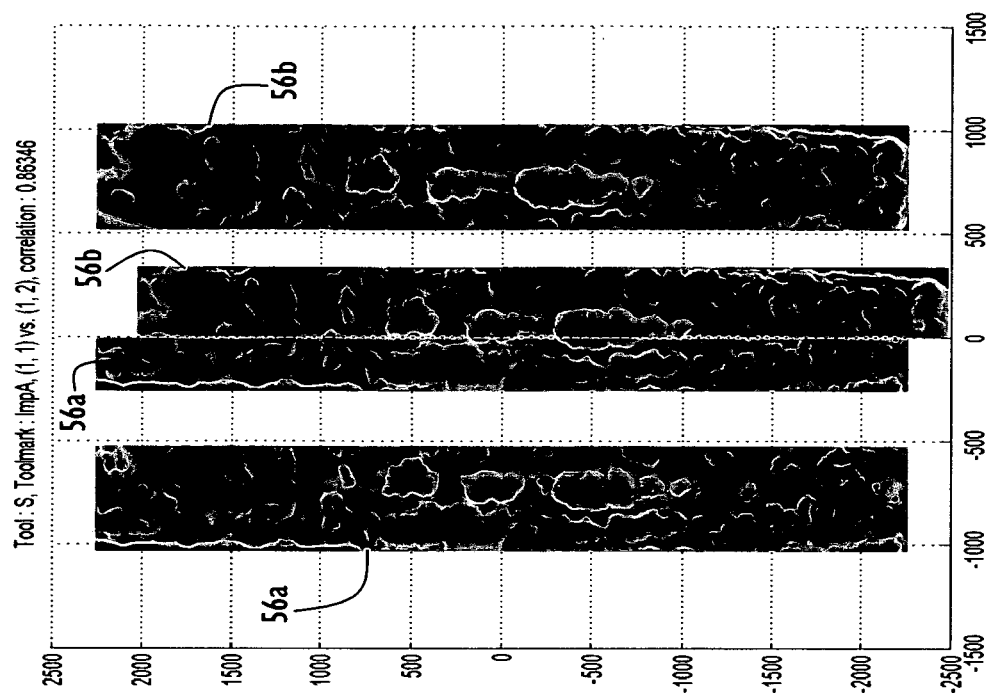
FIG. 26 illustrates on the left a first photographic image depicting a first impressed tool mark signature, different from the first impressed tool mark signature of FIG. 25, illustrates on the right a second photographic image depicting a second impressed tool mark signature, different from the second impressed tool mark signature of FIG. 25, and illustrates in the center the left side of the first image and the right side of the second image to demonstrate alignment of a different pair of tool mark signatures using IFNCC in the automated system and method for tool mark analysis.
Figure 25:
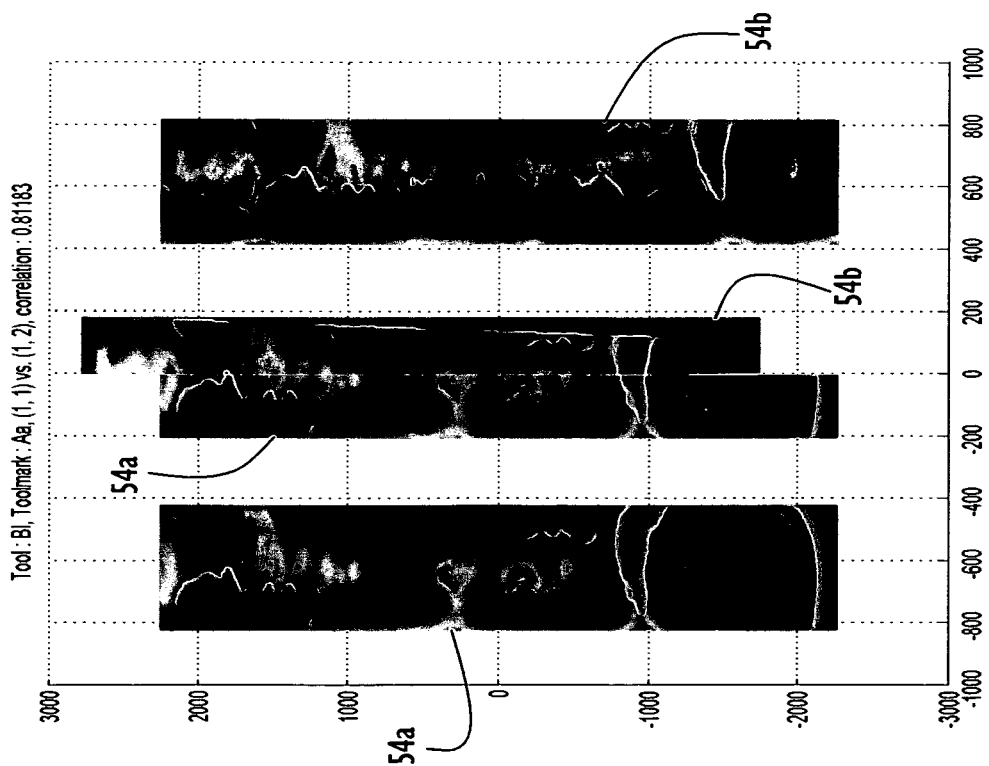
FIG. 25 illustrates on the left a first photographic image depicting a first impressed tool mark signature, illustrates on the right a second photographic image depicting a second impressed tool mark signature, and illustrates in the center the left side of the first image and the right side of the second image to demonstrate alignment of a pair of tool mark signatures using IFNCC in the automated system and method for tool mark analysis.

FIG. 25 illustrates a comparison between a pair of impressed tool mark signatures 54a,54b, created by the same bolt cutter B1, for which a correlation coefficient or similarity value of 0.81183 is computed in accordance with the improved fast normalization cross correlation (IFNCC) described above. The photographic image on the left in FIG. 25 is of tool mark signature 54a, and the photographic image on the right in FIG. 25 is of tool mark signature 54b. The image in the center of FIG. 25 shows alignment of the images tool mark signatures 54a, 54b obtained by the IFNCC algorithm. The left half of the center image comprises the left side of the image of tool mark signature 54a. The right half of the center image comprises the right side of the image of tool mark signature 54b. The right side of the image of tool mark signature 54b has been rotated and shifted (both in x and y axes) as a result of the IFNCC algorithm to align with the left side of the image of tool mark signature 54a. FIG. 26 illustrates a similar comparison between photographic images of a pair of impressed tool mark signatures 56a,56b, created by the same screw driver S, for which a correlation coefficient or similarity value of 0.86346 is computed. In the case of the matching bolt cutter tool mark signatures 54a, 54b, the similarity metric value is 0.81 out of a maximum 1.0. For the pair of matching screwdriver tool mark signatures 56A, 56B, the similarity metric value is 0.86 out of the maximum possible 1.0. Each of these similarity values indicates a high level of agreement between the corresponding tool mark signatures, and provides the basis for a statistically based classifier as described below.

FIG. 27 shows an example of the distribution of similarity metric values obtained by comparing matching and non-matching striated tool mark signatures, created by screw drivers, using the statistical comparison approach described above for striated tool marks and their signatures. The similarity values are shown multiplied by one hundred such that the expected maximum similarity value is one hundred. The similarity values shown in FIG. 27 were obtained by inter-comparing a total of one hundred striated toolmark signatures created by ten different screwdrivers with each screw driver being used to create ten tool marks. As expected, the similarity values resulting from the comparison of tool mark signatures created by the same tool are high, i.e. similarity values close to 100 while the similarity values resulting from the comparison of tool mark signatures created by different tools are low, i.e. close to zero. The total number of matching similarity values is 450, and the number of non-matching similarity values is 4500. FIG. 27 also identifies the median, mean and standard deviation for the similarity values as well as an estimated probability of error (PE), an estimated false positive probability of error (PFP) and an estimated false negative probability of error (PFN) which are computed by the system and are discussed further below. A report such as that shown in FIG. 27 can be displayed on the monitor of the computer and/or provided as a print-out.

FIG. 28 is a table that summarizes illustrative statistical results associated with the distribution of matching and non-matching similarity values for examples of striated (screwdriver) tool marks and impressed (screwdriver and bolt cutter) tool marks. Matching similarity values are those associated with matching tool mark signatures while non-matching similarity values are those associated with non-matching tool mark signatures. The average (mean) and standard deviation of similarity values between matching tool mark signatures obtained from striated screwdriver tool marks was 0.797 and 0.098, respectively, whereas the average (mean) and standard deviation of similarity values obtained by comparing non-matching tool mark signatures of striated screwdriver tool marks was 0.268 and 0.056, respectively. The mean and standard deviation values shown in FIG. 28 for the striated screwdriver tool marks were taken from the results depicted in FIG. 27. These figures demonstrate that, for the set of tool mark signatures under consideration, the distribution of matching and non-matching similarity values are almost non-overlapping. Accordingly, for this set of tools, it is possible to group the tool marks belonging to each of the ten tools with very high certainty. If, for example, a threshold similarity value of 0.47 is used to determine which pairs of tool mark signatures match and which pairs of tool mark signatures do not match, i.e. a matching pair being one with a similarity value higher than 0.47 and a non-matching pair being one with a similarity value of 0.47 or lower, the probability of making an erroneous positive identification or match would be 0.02% while the probability of an erroneous negative identification or non-match would be 0.44% as indicated for the results shown in FIG. 27.

Figure 30:
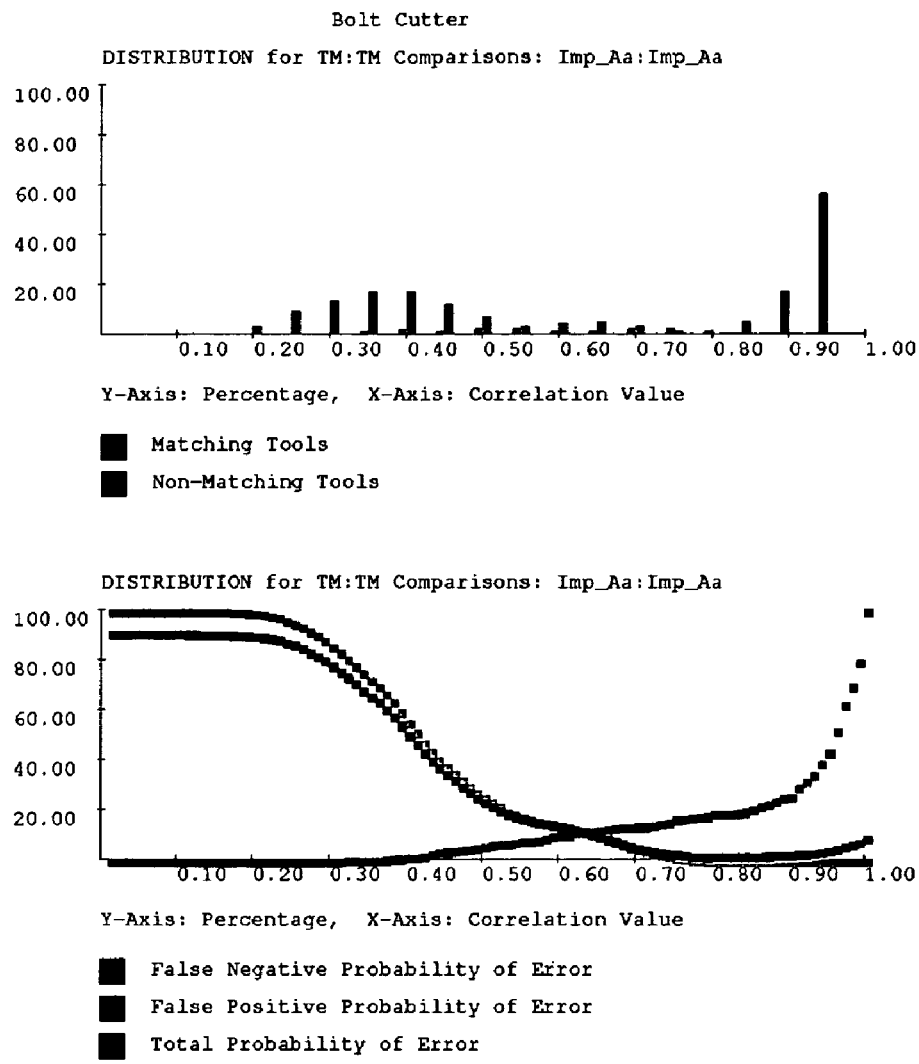
FIG. 30 shows another representative distribution of similarity values obtained by comparing matching and non-matching impressed tool mark signatures.

The mean and standard deviation values set forth in the table of FIG. 28 for impressed screwdriver tool marks are obtained from the results depicted in FIG. 29, which shows the distribution of similarity values obtained by comparing matching and non-matching impressed tool mark signatures derived from impressed tool marks created by screwdrivers. FIG. 30 depicts the distribution of similarity values obtained by comparing matching and non-matching impressed tool mark signatures derived from impressed tool marks created by bolt cutters, and the mean and standard deviation values set forth in FIG. 28 for impressed bolt cutter tool marks are obtained from the results illustrated in FIG. 30. The similarity values which are the basis for the results depicted in FIGS. 29 and 30 are computed by the computation module 42 in the manner described above for the computation of similarity values for impressed tool mark signatures. The similarity values indicated in FIG. 29 were obtained by inter-comparing a total of one hundred impressed screwdriver tool mark signatures created by ten different screwdrivers, with each screwdriver being used to create ten of the impressed screwdriver tool mark signatures. Similarly, the similarity values of FIG. 30 were obtained by inter-comparing a total of one hundred impressed bolt cutter tool mark signatures created by ten different bolt cutters, each bolt cutter being used to create ten of the impressed bolt cutter signatures. As described above for striated tool marks, the similarity values resulting from the comparison of impressed tool mark signatures created by the same tool are high while the similarity values resulting from a comparison of impressed tool mark signatures created by different tools are low. In each of FIGS. 29 and 30, the total number of matching similarity values is 450, and the total number of non-matching similarity values is 4500.

As indicated in the table of FIG. 28 and in FIG. 29, the average and standard deviation of the similarity values between the matching impressed screwdriver tool mark signatures of FIG. 29 are 0.838 and 0.164, respectively, while the average and standard deviation of similarity values between the non-matching impressed screwdriver tool mark signatures of FIG. 29 are 0.378 and 0.096, respectively. In FIGS. 28 and 30, the average and standard deviation of the similarity values between the matching impressed bolt cutter tool mark signatures are 0.888 and 0.159, respectively, whereas the average and standard deviation of similarity values between the non-matching impressed bolt cutter tool mark signatures are 0.434 and 0.131, respectively. FIGS. 29 and 30 demonstrate that, for each set of tool marks under consideration (impressed screwdriver tool marks and impressed bolt cutter tool marks), the distribution of matching and non-matching similarity values is mildly overlapping. Accordingly, for each set of these tools (screwdrivers and bolt cutters), it is possible to group the tool marks belonging to each of the ten tools with very high certainty. Assuming a threshold similarity value of 0.65 for the impressed screwdriver tool mark signatures and 0.79 for the impressed bolt cutter tool mark signatures is used to decide which pairs of tool mark signatures match as explained above for the striated screwdriver tool mark signatures, the probability of making an erroneous positive identification (PFP) would be 0.22% for the impressed screwdriver tool mark signatures in FIG. 29 and 0.00% for the impressed bolt cutter mark signatures in FIG. 30. The probability of making an erroneous negative identification (PFN) is 13.55% for the impressed screwdriver tool mark signatures of FIG. 29 and 18% for the impressed bolt cutter tool mark signatures of FIG. 30

The components thus far described, i.e. acquisition module 14, pre-processing module 16, calibration module 18, normalization module 20, signature generation module 22 and computation module 42, provide a fully functional 3D base, automated tool mark analysis system and method by which 3D image data of tool marks are acquired by the acquisition module 14 from specimens and provided as raw data to the computer for refinement via the pre-processing module 16, the calibration module 18 and the normalization module 20. The refined data is then used by the signature generation module 22 to generate tool mark signatures corresponding to the tool marks from which the data was acquired. Tool mark signatures obtained from questioned specimens are stored in the questioned signatures database 24 and, if acquired, tool mark signatures obtained from control specimens are stored in the control signatures database 26 as depicted in FIG. 1. The computation module 42 compares pairs of the tool mark signatures from the questioned signatures database 24 and, if available, from the control signatures database 26, to obtain a similarity value for the pair of tool mark signatures being compared as represented in FIG. 2. The process implemented by the computation module 42 to obtain a similarity value for a pair of striated tool mark signatures is different from that implemented to obtain a similarity value for a pair of impressed tool mark signatures as described above. The similarity values computed by the computation module 42 reflect the degree of similarity between the pairs of tool mark signatures under comparison and are stored in the similarity values database 48 of analysis unit 12 as indicated in FIG. 2. Once similarity values have been obtained for pairs of tool mark signatures, various characteristics relating to the similarity values can be generated by the system, and these can also be stored in the similarity values database 48. The similarity values in the similarity values database 58 and/or the characteristics relating to the similarity values can be used by the analysis unit 12 and/or the operator of the system to conclude whether or not a pair of specimens can be considered matching or non-matching. The similarity values and/or the characteristics relating to the similarity values can be used for various purposes, for example to rank the degree of similarity between a particular specimen, possibly a piece of evidence, and a list of known specimens. From this information, the system and/or the operator can conclude whether or not a pair of tool marks can be considered created by the same tool.

The classifier module 44 and the uniqueness evaluator module 46 allow the capabilities of the automated system and method for tool mark analysis to be expanded. Implementation of the uniqueness evaluation module 46 requires that the similarity values database 48 contain reference or control similarity values 58 which are obtained from the comparison of control tool mark signatures acquired from control specimens. Reference similarity values 58 from the similarity values database 48 are provided as input to the uniqueness evaluation module 46. Where a number of control tools are available of the type and model for which it is desired to assess statistical results, a number of control tool marks are created with each control tool to provide the control specimens from which tool mark data is acquired by the acquisition module 14 for generation of control tool mark signatures by the signature generation module 22, which signatures are compared by the computation module 42 to obtain the reference similarity values 58 stored in the similarity values database 48 and provided as input to the uniqueness evaluation module 46. The reference similarity values 58 would thusly include those for matching (created by the same tool) tool marks and non-matching (created by different tools) tool marks. From a comparison of the reference similarity values 58 by the uniqueness evaluator module 46, the distribution of matching reference similarity values, i.e. those associated with matching tool mark signatures from tool marks created by the same tool, and non-matching reference similarity values, i.e. those associated with non-matching tool mark signatures from tool marks created by different tools, can be estimated by the uniqueness evaluation module 46 as previously referred to in connection with FIGS. 27, 33 and 34. These distributions are used to assess the "uniqueness" of the tool marks under consideration by evaluating their similarity. If the distributions of the matching and non-matching reference similarity values have little or no overlap, then the tool marks created by the corresponding tools are highly unique. On the other hand, if these distributions have significant overlap, the tool marks created by the corresponding tools are not unique.

Various approaches can be implemented by the uniqueness evaluation module 46 to evaluate the uniqueness of a set of tools based on the distribution of matching reference similarity values obtained from the comparison of control tool mark signatures derived from control tool marks created by the same make and model tool as that of the tool of interest. The following procedure represents one embodiment of a procedure that can be implemented by the uniqueness evaluation module 46 to test for tool uniqueness:

1) Given a set of l tools, create $m_c$ tool marks with each of the tools ($m_c$ to be determined according to a desired level of significance).
2) After acquiring all tool marks and generating their signatures, compute two sets of similarity values:
   a) Matching similarity values (referred to as set r): This set is composed of the similarity values resulting from the comparison of tool mark signatures from tool marks created by the same tool. This set will be composed of $$l * \frac{m_c(m_c - 1)}{2}$$

similarity values.
   b) Non-matching similarity values (referred to as set w): This set is composed of the similarity values resulting from the comparison of tool mark signatures from tool marks created by different tool. This set will be composed of $$m_c^2 * \frac{l(l-1)}{2}$$

similarity values.
3) Evaluate the similarity between the distributions of matching r and non-matching w similarity values through some metric (such as p-value).
4) If the results of the statistical test are below a pre-established significance level, the tools and tool marks under consideration are considered to have "uniqueness." Otherwise, the tools and tool marks under consideration will be considered "non-unique."

Considering the similarity values associated with tool mark signatures created by the same tool (matching similarity values, labeled r) and similarity values associated with tool mark signatures created by different tools (non-matching similarity values, labeled w) step 3 of the procedure tests whether the sample distribution of the matching similarity values and the non-matching similarity values are sufficiently distinct to conclude that the probability of both having been generated by the same statistical process is very low. It is preferred that the statistical test applied in step 3 comprise a non-parametric test and that it not rely on the normality-of-data assumption. A variety of ways may be used to quantify the similarity between two distributions including by their overlap area, distance between means, and normalized distance between means. Some of the approaches that may be used by the uniqueness evaluation module 46 to execute step 3 are discussed further below.

The rank sum test is one approach that can be used by the uniqueness evaluation module 46 to evaluate the similarity between the distributions of the matching and non-matching similarity values by estimating the probability that the same statistical process could have produced both the matching and non-matching sample distribution. The rank sum test may involve a hypothesis testing problem, where the hypotheses are:

H0: the probability distributions from which the sample distributions of both the matching and non-matching coefficients (similarity values) arose are not different from one another, H1: the samples arose from different probability distributions.

A variety of statistical tests can be used to estimate the probability of error in rejecting hypothesis H0 (in other words, the probability of error in concluding that the two distributions are the same), also known as the p-value. The lower the p-value is, the less likely it is that both sample distributions originated from the same statistical process. Accordingly, the difference between the two distributions is quantified by computing the p-value associated with the two sample sets. If the distributions in question are not normal, a non-parametric test is called for, examples of such tests being a rank sum test or a permutation test.

Another approach that may be used by the uniqueness evaluator module 46 is a "hard threshold: approach. Given the distributions of the sets r and w defined in steps 2a and 2b above, a "hard threshold" approach involves computing the optimal threshold (Topt), which minimizes, in an empirical sense, the probability of error associated with a classification decision for these two distributions. Having obtained the optimal threshold, Topt, the mean of the set of similarity measures e is computed. An evidence specimen will be classified as a match with the control specimens if the mean of the similarity measure set e is greater than the optimal threshold or, in other words, closer to the best orientation similarity measure distribution r. Otherwise, it will be classified as a non-match.

Another approach involves the closest mean, which is based on the distance between the mean values of the different distributions under consideration. In other words, if $|\bar{r} - \bar{e}| < |\bar{w} - \bar{e}|$ (where $|\bullet|$ denotes absolute value of $\bullet$, and $\bar{\bullet}$ denotes mean of $\bullet$) the evidence specimen is classified as matching the control specimens. Otherwise, it is classified as non-matching.

A further approach involves the normalized closest mean, which is similar to the closest mean criterion discussed above except that the "distances" are normalized by the appropriate standard deviations. In other words, if $|\bar{r}-\bar{e}|/\sigma(r) < |\bar{w}-\bar{e}|/\sigma(w)$, (where $\sigma(\bullet)$ denotes standard deviation of $\bullet$), the evidence $\bullet$), the evidence specimen is classified to be a match with the control specimens. Otherwise, it is classified as non-match with the control specimens.

The output of the tool uniqueness procedure set forth above incorporating any of the aforementioned approaches corresponds to the uniqueness assessment output 60 of the uniqueness evaluation module 46.

The classifier module 44 makes use of both types of similarity values, questioned similarity values 57 and reference similarity values 58, in conjunction with each other to perform a statistically based classification of a pair of tool marks. The typical tool mark-to-tool mark classification problem deals with the question of classifying an evidence tool mark as being created by or as not being created by a suspect tool. In practice, when confronted with this problem, a tool marks examiner will create control tool marks with the suspect tool and then determine whether the evidence tool mark matches with the control tool marks. When provided with the appropriate set of reference similarity values 58, i.e. similarity values resulting from comparison of matching and non-matching control tool mark signatures obtained from control tool marks made by tools of the same type and model as the suspect tool, the system and method of tool mark analysis can assist the tool marks examiner not only in making a matching/non-matching determination, but also by assessing the probability of error associated with such a determination.

Given questioned similarity values associated with questioned pairs of tool marks (or possibly an evidence tool mark against a set of control tool marks) and reference similarity values associated with control tool marks created with tools of the same class characteristics (or manufacturer) as those of the questioned tool marks, the classified module 44 can perform a statistically based classification for the questioned similarity values against the reference similarity values. In general terms, when faced with a classification decision, the classification module 44 can operate by making a comparison between control tool mark signatures obtained from control tool marks made by a suspect tool and a questioned tool mark signature obtained from an evidence tool mark in order to obtain a sample of evidence-to-control similarity measures since, at this point, it is not known if the evidence tool mark signature matches or does not match the control tool mark signature. The classifier module 44 may then determine whether the sample distribution of evidence-to-control similarity measures most resembles the matching or the non-matching distribution corresponding to the tool mark signatures for tool marks made by tools of the same make and model as that of the suspect tool and stored in the similarity values database. From this information, it is also possible to estimate the probability of a false positive or a false negative determination.

FIGS. 27, 33 and 34 already discussed above show typical examples of the distribution of matching and non-matching similarity values for striated and impressed tool mark signatures. Considering as an example the classification of an striated screwdriver tool mark, as represented by FIG. 27, the tool marks examiner would create a set of control tool marks with the suspect screwdriver and would utilize the automated system and method for tool mark analysis to acquire image data for the control tool marks and similarity values for the control tool mark signatures. In addition, the tool marks examiner would utilize the system and method to acquire image data for the evidence tool mark for computation of its tool mark signature. Under the direction of the tool marks examiner, the system would compare the evidence tool mark signature against the control tool mark signatures and, in that manner, obtain a sample of the evidence-to-control tool mark similarity values distribution. In order to decide if the evidence-to-control tool mark similarity distribution is that of a matching set of tools or that of a non-matching set of tools, the classifier module 44 compares the evidence-to-control tool mark similarity distribution with that of the matching and non-matching reference similarity values. In the example of the striated screwdriver tool mark, the evidence-to-control tool mark similarity distribution would be compared with the distribution shown in FIG. 27. If the distribution of evidence-to-control tool mark similarity values is more similar to the matching distribution than to the non-matching distribution in FIG. 27, the system would recommend that a "matching" classification value be assigned. Otherwise, a "non-matching" recommendation would be issued as output of the classification module. The matching or non-matching determination corresponds to the class assessment output 74 indicated in FIG. 2.

The aforementioned principle is applied in the algorithm implemented by the classifier module 44. In one preferred embodiment, the following algorithm is implemented by the classifier module:

1) Given a suspect tool and an evidence tool mark, create m control tool marks with the suspect tool.
2) After acquiring all control tool mark data and generating their signatures, compute similarity values obtained from the comparison of all control tool mark signatures and the evidence tool mark signature. This set of similarity values can be referred to as e.
4) Perform two statistical tests to evaluate the following hypothesis:
   a. Evaluate the similarity between the distribution of e and the distribution of the corresponding set of matching Reference Similarity Values (this set is referred to as r) through some metric (such as p-value).
   b. Evaluate the similarity between the distribution of e and the distribution of the corresponding set of non-matching Reference Similarity Values (this set is referred to as w) through some metric (such as p-value).
5) Accept the hypothesis associated with the distribution which best resembles that of set e (matching or non-matching). In other words, if set e is more similar to the matching similarity values set, classify the evidence tool mark as matching the tool. Conversely, if set e is more similar to the non-matching similarity values set, classify the evidence tool mark as not matching the tool. The procedure outlined above for classification involves the specification of a metric (or measure of distance) between distribution in step 4. A number of possible metrics have already been discussed above and these metrics, among various others, can be used for implementation of the classification procedure outlined above.

In addition to providing as output a recommendation of matching or non-matching, the classifier module 44 can provide as part of its class assessment output 74 an estimate of the probability of error associated with a recommendation of matching or non-matching. The availability of the matching and non-matching reference similarity values enables the classifier module 44 to compute an estimate of the probability of error. If the class assessment output is a matching recommendation, the probability of a false positive can be estimated by the classifier module on the basis of the distribution of non-matching reference similarity values. As an example, the average resulting from the comparison of m control tool mark mean values of the set of similarity values e can be denoted by $\bar{e}$. By estimating the probability of obtaining sample average value $\bar{e}$ (or higher), assuming the underlying distribution is that of the non-matching similarity values, the probability of a false positive recommendation is estimated. A similar principle is used to estimate the probability of a false negative identification. However, the distribution of matching similarity values is oftentimes more variable than that of the non-matching similarity values making it more challenging to estimate accurately.

In the system and method for automated tool mark analysis, tool marks are characterized as 3-D objects and numerical similarity values are computed reflecting the degree of similarity between pairs of tool mark signatures. Statistical methodologies are applied to a well-defined similarity metric to quantify the statistical difference between known matching and known non-matching tool mark signatures. The system and method for automated tool mark analysis provide output information including a numerical value reflecting the degree of similarity between two tool marks, a statistically based assessment of the likelihood that the same tool created a pair of tool marks under consideration, and/or an assessment of the uniqueness of tool marks of the same class characteristics. Given a set of control tool mark signatures belonging to specimens of the same class characteristics, the uniqueness evaluation module assesses the uniqueness of a particular class of specimens by analyzing the similarity values corresponding to pairs of tool mark signatures created by the same tool and those created by different tools. The two types of similarity values can be used in conjunction with each other to perform statistically based classifications of pairs of tool marks. Given questioned similarity values associated with questioned pairs of tool marks (or possibly evidence tool marks against a set of control tool marks) and reference similarity values associated with control tool marks created with tools of the same class characteristics, the classifier module performs a statistically based classification for the questioned similarity values against the reference similarity values.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. An automated system for tool mark analysis comprising an acquisition mechanism for acquiring 3D data of tool marks left on the surfaces of specimens by tools operating on the specimens, said acquisition mechanism being capable of acquiring 3D from impressed tool marks and from striated tool marks;
a signature generation module for generating tool mark signatures from the acquired data corresponding to the respective tool marks;
an analysis unit for statistically evaluating pairs of the tool mark signatures for impressed tool marks in relation to one another and for statistically evaluating pairs of the tool mark signatures for striated tool marks in relation to one another, said analysis unit being capable of computing a numerical similarity value for each pair of tool mark signatures reflecting the degree of similarity between the tool mark signatures of each pair, said analysis unit employing a frequency domain-based similarity metric to compute a similarity value for each pair of tool mark signatures for impressed tool marks and employing a relative distance similarity metric to compute a similarity value for each pair of tool mark signatures for striated tool marks; and
a database in which said similarity values are stored.

2. The automated system for tool mark analysis recited in claim 1 wherein said database comprises questioned similarity values associated with questioned tool mark signatures of unknown origin and reference similarity values associated with control tool mark signatures of known origin corresponding to control specimens.

3. The automated system for tool mark analysis recited in claim 2 wherein said analysis unit is capable of performing a statistically based classification for the questioned similarity values against the reference similarity values.

4. An automated system for tool mark analysis comprising an acquisition mechanism for acquiring 3D data of tool marks left on the surfaces of specimens by tools operating on the specimens, said acquisition mechanism including a 2D imaging mechanism for identifying regions of interest on the surfaces of the specimens for 3D data acquisition;
a signature generation module for generating tool mark signatures from the acquired data corresponding to the respective tool marks;
an analysis unit for statistically evaluating pairs of the tool mark signatures in relation to one another, said analysis unit being capable of computing a numerical similarity value for each pair of tool mark signatures reflecting the decree of similarity between the tool mark signatures of each pair; and
a database in which said similarity values are stored.

5. An automated system for tool mark analysis comprising an acquisition mechanism for acquiring 3D data of tool marks left on the surfaces of specimens by tools operating on the specimens;
a signature generation module for generating tool mark signatures from the acquired data corresponding to the respective tool marks;
a data pre-processing module for operating on the acquired 3D data prior to signature generation, said data pre-processing module being capable of decimating the acquired 3D data, identifying unreliable data points in the acquired 3D data, replacing the unreliable data points with interpolated values, and identifying sections of the data of greatest reliability to obtain pre-processed data for each tool mark;
an analysis unit for statistically evaluating pairs of the tool mark signatures in relation to one another, said analysis unit being capable of computing a numerical similarity value for each pair of tool mark signatures reflecting the degree of similarity between the tool mark signatures of each pair; and
a database in which said similarity values are stored.

6. The automated system for tool mark analysis recited in claim 5 and further comprising a normalization module for operating on the pre-processed data prior to signature generation, said normalization module being capable of transforming the pre-processed data for each tool mark into a Cartesian coordinate representation and normalizing the Cartesian coordinate representation with respect to a reference surface.

7. The automated system for tool mark analysis recited in claim 6 wherein said normalization module is capable of applying a second-order leveling algorithm to the pre-processed data to obtain second-order leveled data for each tool mark, and applying a first-order leveling algorithm to the second-order leveled data to obtain first-order leveled data for each tool mark.

8. The automated system for tool mark analysis recited in claim 7 wherein the tool marks are striated tool marks and said signature generation module is capable of histogram equalizing the normalized data to obtain histogram equalized data, estimating local gradients for the histogram equalized data for each tool mark, identifying the dominant gradient direction for each tool mark from the corresponding local gradients, identifying the direction of the striations for each tool mark, projecting each tool mark onto a plane perpendicular to the direction of its striations to obtain a cross-sectional profile for each tool mark, and filtering the profiles to obtain the tool mark signatures for the tool marks.

9. The automated system for tool mark analysis recited in claim 8 wherein the similarity values computed by said analysis unit are based on relative distance similarity metrics.

10. The automated system for tool mark analysis recited in claim 7 wherein the tool marks are impressed tool marks and said signature generation module is capable of creating a data set from the normalized data for each tool mark contained in a two-dimensional data set to obtain the tool mark signature for each tool mark.

11. The automated system for tool mark analysis recited in claim 10 wherein the similarity values computed by said analysis unit are based on improved fast normal cross correlations.

12. The automated system for tool mark analysis recited in claim 6 and further including a calibration module for calculating calibration parameters associated with misalignments of the acquisition mechanism for use by said normalization module to refine the acquired data to compensate for the misalignments.

13. An automated method for tool mark analysis comprising the steps of
acquiring 3D data of tool marks left on the surfaces of specimens by tools operating on the specimens;
generating tool mark signatures for the respective tool marks from the acquired 3D data via a computer;
statistically evaluating pairs of the tool mark signatures in relation to one another via the computer, wherein said step of statistically evaluating includes implementing a frequency domain-based similarity metric where the pairs of tool mark signatures are for impressed tool marks and said step of statistically evaluating includes implementing a relative distance similarity metric where the pairs of tool mark signatures are for striated tool marks; and
providing a numerical similarity value via the computer for each pair of tool mark signatures reflecting the degree of similarity between the tool mark signatures of each pair.

14. An automated method for tool mark analysis comprising the steps of
acquiring 3D data of tool marks left on the surfaces of specimens by tools operating on the specimens;
preprocessing the acquired data to eliminate unreliable data points;
normalizing the preprocessed data to eliminate extraneous artifacts;
generating tool mark signatures for the respective tool marks from the acquired 3D data via a computer subsequent to said steps of preprocessing and normalizing;
statistically evaluating pairs of the tool mark signatures in relation to one another via the computer; and
providing a numerical similarity value via the computer for each pair of tool mark signatures reflecting the decree of similarity between the tool mark signatures of each pair.

15. The automated method for tool mark analysis recited in claim 14 wherein said step of preprocessing includes decimating the data, identifying unreliable data points, replacing unreliable data points with interpolated values, and identifying the most reliable section of the data.

16. The automated method for tool mark analysis recited in claim 14 wherein said step of normalizing includes transforming the preprocessed data into a Cartesian coordinate representation and normalizing the Cartesian coordinate representation with respect to a reference surface.

17. The automated method for tool mark analysis recited in claim 16 wherein said step of normalizing includes second order leveling of the data and first order leveling of the data.

18. The automated method for tool mark analysis recited in claim 17 wherein the tool marks are impressed tool marks and said step of generating includes filtering the normalized data.

19. The automated method for tool mark analysis recited in claim 16 wherein the tool marks are striated tool marks and said step of generating includes histogram equalizing the normalized data, estimating local gradients for every point of the histogram equalized data, identifying the dominant gradient direction, identifying the direction of the striations of the tool mark, obtaining a cross-sectional profile of the tool mark, and filtering the profile.

* * * * *